(12) United States Patent
Brar et al.

(10) Patent No.: US 12,443,450 B2
(45) Date of Patent: Oct. 14, 2025

(54) SUPERCLUSTER NETWORK OF GRAPHICAL PROCESSING UNITS (GPUS)

(71) Applicant: Oracle International Corporation, Redwood Shores, CA (US)

(72) Inventors: Jagwinder Singh Brar, Bellevue, WA (US); David Dale Becker, Seattle, WA (US); Jacob Robert Uecker, Las Vegas, NV (US)

(73) Assignee: Oracle International Corporation, Redwood Shores, CA (US)

( * ) Notice: Subject to any disclaimer, the term of this patent is extended or adjusted under 35 U.S.C. 154(b) by 123 days.

(21) Appl. No.: 18/500,463

(22) Filed: Nov. 2, 2023

(65) Prior Publication Data
US 2024/0152396 A1   May 9, 2024

Related U.S. Application Data

(60) Provisional application No. 63/583,512, filed on Sep. 18, 2023, provisional application No. 63/460,766, (Continued)

(51) Int. Cl.
*G06F 9/50* (2006.01)
*G06F 13/40* (2006.01)
(Continued)

(52) U.S. Cl.
CPC .......... *G06F 9/5027* (2013.01); *G06F 9/5083* (2013.01); *G06F 13/4022* (2013.01);
(Continued)

(58) Field of Classification Search
None
See application file for complete search history.

(56) References Cited

U.S. PATENT DOCUMENTS 9,497,039 B2   11/2016 Greenberg et al.
2019/0097914 A1   3/2019 Zhong et al.
(Continued)

FOREIGN PATENT DOCUMENTS

EP   3531633 A1   8/2019
WO   2022146589 A1   7/2022

OTHER PUBLICATIONS

PCT/US2023/078464, "International Search Report and Written Opinion", Feb. 20, 2024, 18 pages.
(Continued)

*Primary Examiner* — Scott C Sun
(74) *Attorney, Agent, or Firm* — Kilpatrick Townsend & Stockton LLP

(57) ABSTRACT

Described herein is a network fabric including a plurality of graphical processing unit (GPU) clusters. The plurality of GPU clusters includes at least a first GPU cluster operating at a first speed and a second GPU cluster operating at a second speed that is different than the first speed. The network fabric includes a plurality of blocks, wherein each block includes: (a) one or more racks that host a GPU cluster, and (b) a plurality of switches arranged in a hierarchical structure that communicatively couple the block to other blocks included in the network fabric. Responsive to receiving a request to execute a workload, allocating one or more GPUs from the plurality of GPU clusters to execute the workload.

20 Claims, 22 Drawing Sheets

Related U.S. Application Data filed on Apr. 20, 2023, provisional application No. 63/425,646, filed on Nov. 15, 2022, provisional application No. 63/424,282, filed on Nov. 10, 2022, provisional application No. 63/422,650, filed on Nov. 4, 2022.

(51) Int. Cl.
    *H04L 45/24*     (2022.01)
    *H04L 45/74*     (2022.01)

(52) U.S. Cl.
    CPC .............. *H04L 45/24* (2013.01); *H04L 45/74* (2013.01); *G06F 2209/505* (2013.01)

(56) References Cited

U.S. PATENT DOCUMENTS

| | | |
|---|---|---|
| 2019/0312772 A1 | 10/2019 | Zhao et al. |
| 2020/0021898 A1 | 1/2020 | Sindhu et al. |
| 2020/0341794 A1 | 10/2020 | Martin |
| 2024/0094796 A1* | 3/2024 | Narayanaswamy .... G06F 1/206 |

OTHER PUBLICATIONS

International Application No. PCT/US2023/078464, Written Opinion of the International Preliminary Examining mailed on May 22, 2024, 12 pages.

Introducing the AI Research SuperCluster-Meta's Cutting-Edge AI Supercomputer for AI Research, Available online at: https://ai.meta.com/blog/ai-rsc/, Jan. 24, 2022, pp. 1-9.

International Application No. PCT/US2023/078465, International Search Report and Written Opinion mailed on Feb. 5, 2024, 16 pages.

International Application No. PCT/US2023/078470, International Search Report and Written Opinion mailed on Feb. 16, 2024, 13 pages.

Li , et al., "Survey on Traffic Management in Data Center Network: From Link Layer to Application Layer", Institute of Electrical and Electronics Engineers Access, vol. 9, Mar. 4, 2021, pp. 38427-38456.

PCT/US2023/078467 , "International Search Report and Written Opinion", Mar. 4, 2024, 14 pages.

Stunkel , et al., "The High-speed Networks of the Summit and Sierra Supercomputers", IBM Journal of Research and Development, vol. 64, No. 3/4, Jan. 16, 2020, pp. 3:1-3:10.

International Application No. PCT/US2023/078465, International Preliminary Report on Patentability mailed on May 15, 2025, 12 pages.

International Application No. PCT/US2023/078467, International Preliminary Report on Patentability mailed on May 15, 2025, 10 pages.

International Application No. PCT/US2023/078470, International Preliminary Report on Patentability mailed on May 15, 2025, 10 pages.

* cited by examiner

SUPERCLUSTER NETWORK OF GRAPHICAL PROCESSING UNITS (GPUS)

CROSS-REFERENCES TO RELATED APPLICATIONS

The present application is a non-provisional of and claims the benefit of each of the following provisional applications. The entire contents of each of the following provisional applications is incorporated herein by reference for all purposes:
(1) U.S. Provisional Application No. 63/422,650, filed on Nov. 4, 2022;
(2) U.S. Provisional Application No. 63/424,282, filed on Nov. 10, 2022;
(3) U.S. Provisional Application No. 63/425,646, filed on Nov. 15, 2022;
(4) U.S. Provisional Application No. 63/460,766, filed on Apr. 20, 2023;
(5) U.S. Provisional Application No. 63/583,512, filed on Sep. 18, 2023;

FIELD

The present disclosure generally relates to cloud architectures, and more particularly to a supercluster architecture of graphical processing units (GPUs). More specifically, the present disclosure is related to a network architecture that provides for hybrid clusters of GPUs (e.g., different generations of GPUs, or GPUs operating at different speeds, etc.) to coexist in a same network fabric. The supercluster architecture provides for seamless scaling of GPUs with the ever increasing customer demands.

BACKGROUND

Organizations continue to move business applications and databases to the cloud to reduce the cost of purchasing, updating, and maintaining on premise hardware and software. High performance computer applications consistently consume all of the available compute power to achieve a specific outcome or result. Such applications require dedicated network performance, fast storage, high compute capabilities, and significant amounts of memory—resources that are in short supply in the virtualized infrastructure that constitutes today's commodity clouds.

Cloud infrastructure service providers offer newer and faster graphical processing units (GPUs) to address the requirements of such applications. A GPU workload is typically executed on one or more host machines. Typically, such workloads are not able to achieve an expected level of throughput. One factor for this problem is the lack of flow entropy e.g., equal cost multi-path (ECMP) flow entropy. Furthermore, the problem is worsened by the fact that host machines (i.e., hosts) exchange traffic without regard for which other hosts are in their local network neighborhood.

Moreover, traditional GPU clusters generally scale in the range of 1K to 4K GPUs. The limit on scaling the number of GPUs is due a limitation imposed by a network topology that is constructed to support the GPU clusters. The network topology constructed to support GPU clusters incurs a significant amount of oversubscription, thus posing challenges to scale the cluster. Further, the traditional GPU clusters impose strict limitations on the routing policy employed within the cluster. For instance, traditional GPU clusters do not support standard custom routing protocols. Additionally, the traditional GPU clusters are built in a manner such that they support one transmission speed for all GPUs in the cluster. Thus, there is a requirement to build a GPU cluster that can scale at levels much higher than those of traditional GPUs clusters as well support communication between different GPU clusters operating at different transmission speeds. Embodiments discussed herein address these and other issues.

SUMMARY

The present disclosure relates to cloud architectures, and more particularly to a supercluster architecture of graphical processing units (GPUs). More specifically, the present disclosure is related to a network architecture that provides for hybrid clusters of GPUs (e.g., different generations of GPUs, or GPUs operating at different speeds, etc.) to coexist in a same network fabric. The supercluster architecture provides for seamless scaling of GPUs with the ever increasing customer demands. Various embodiments are described herein, including methods, systems, non-transitory computer-readable storage media storing programs, code, or instructions executable by one or more processors, and the like. Some embodiments may be implemented by using a computer program product, comprising computer program/instructions which, when executed by a processor, cause the processor to perform any of the methods described in the disclosure.

One aspect of the present disclosure provides for a method comprising: providing a network fabric including: (i) a plurality of graphical processing unit (GPU) clusters, the plurality of GPU clusters including at least a first GPU cluster operating at a first speed and a second GPU cluster operating at a second speed that is different than the first speed, and (ii) a plurality of blocks, wherein each block includes: (a) one or more racks that host a GPU cluster, and (b) a plurality of switches arranged in a hierarchical structure that communicatively couple the block to other blocks included in the network fabric; and responsive to receiving a request to execute a workload, allocating one or more GPUs from the plurality of GPU clusters to execute the workload.

An aspect of the present disclosure provides for a computing device comprising one or more data processors, and a non-transitory computer readable storage medium containing instructions which, when executed on the one or more data processors, cause the computing device to perform part or all of one or more methods disclosed herein.

Another aspect of the present disclosure provides for a computer-program product tangibly embodied in a non-transitory machine-readable storage medium, including instructions configured to cause one or more data processors to perform part or all of one or more methods disclosed herein.

The foregoing, together with other features and embodiments will become more apparent upon referring to the following specification, claims, and accompanying drawings.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
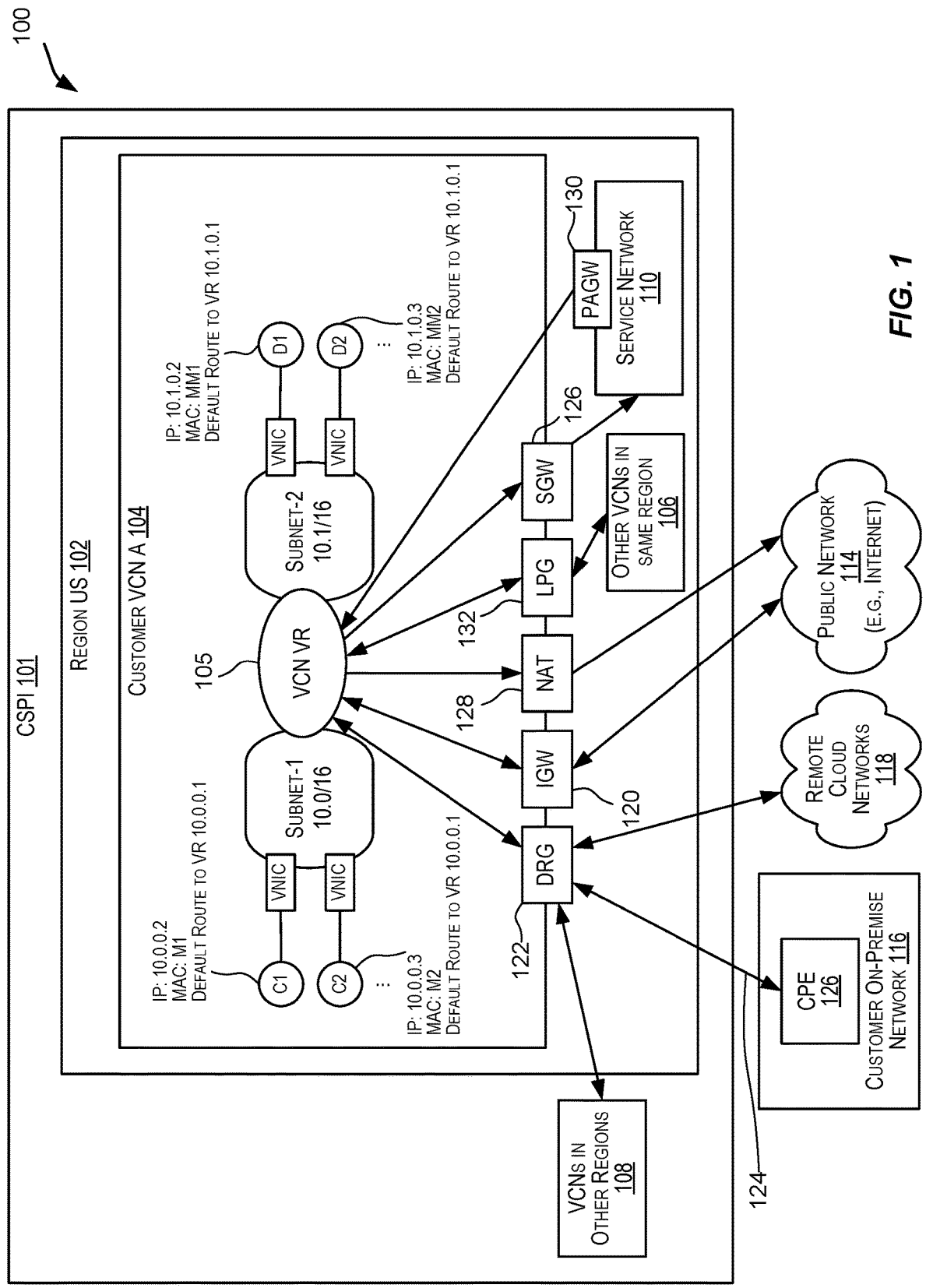
FIG. 1 is a high-level diagram of a distributed environment showing a virtual or overlay cloud network hosted by a cloud service provider infrastructure according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Embodiments of the present disclosure relate to cloud architectures, and more particularly to a supercluster architecture of graphical processing units (GPUs). More specifically, the present disclosure is related to a network architecture that provides for hybrid clusters of GPUs (e.g., different generations of GPUs, or GPUs operating at different speeds, etc.) to coexist in a same network fabric. The supercluster architecture provides for seamless scaling of GPUs with the ever increasing customer demands.

Examples of Cloud Networks

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premises servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)) Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken, and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a customer's virtual cloud network (VCN). Two different customers or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that is represents or maps to multiple real IP addresses. A virtual IP address provides a 1-to-many mapping between the virtual IP address and multiple real IP addresses. For example, a load balancer may use a VIP to map to or represent multiple servers, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in a virtual network built on top of the physical network components. In certain embodiments, the CSPI is organized and hosted in realms, regions, and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premises networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with publicly accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN, and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN, and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG.

1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP), and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 12, 13, 14, and 15 (see references 1216, 1316, 1416, and 1516) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, and 12-16, and are described below. FIG. 1 is a high-level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN c/o Oracle International Corporation for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has a private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has a private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premises network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 12, 13, 14, and 15 (for example, gateways referenced by reference numbers 1234, 1236, 1238, 1334, 1336, 1338, 1434, 1436, 1438, 1534, 1536, and 1538) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's FastConnect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked, and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
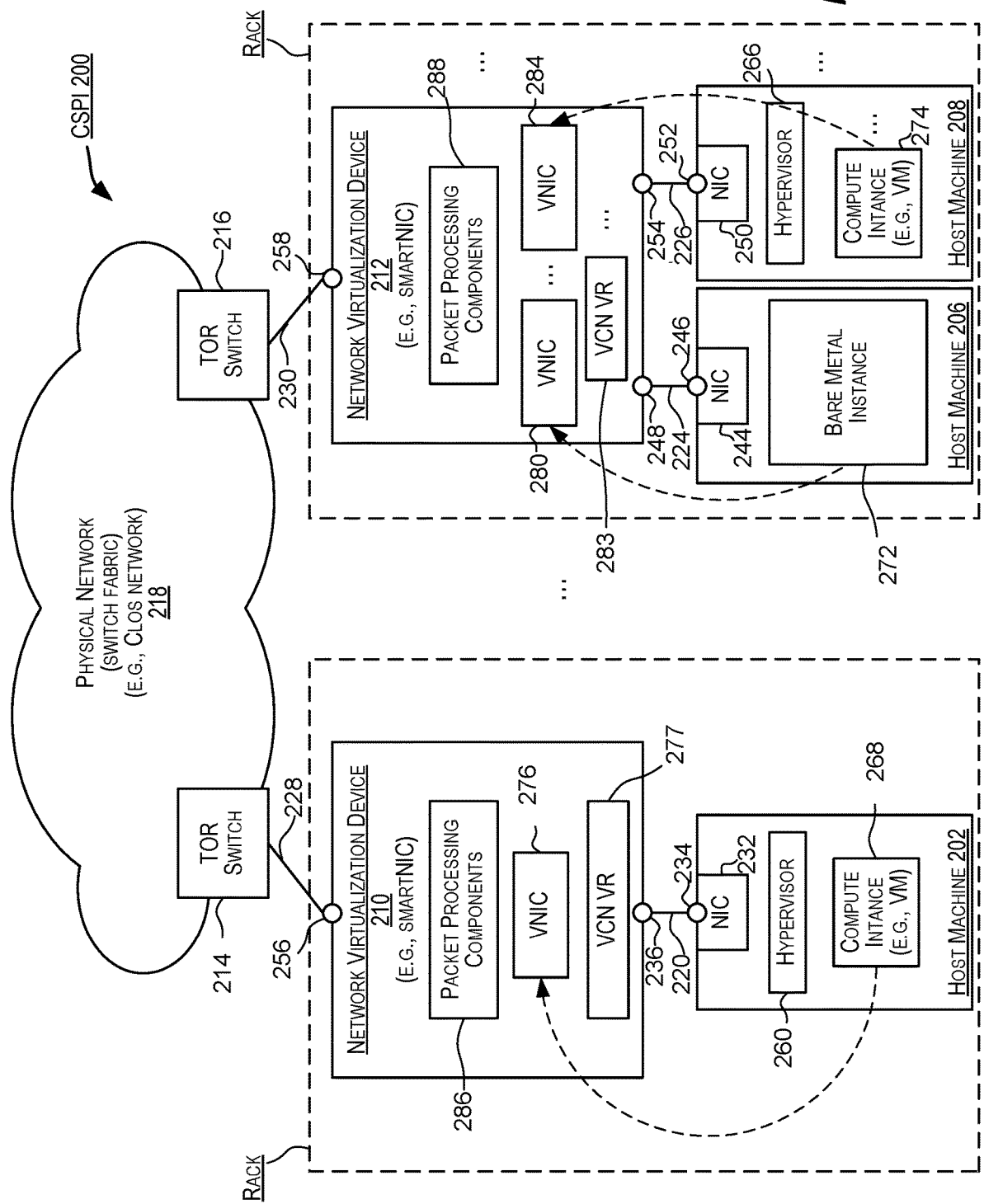
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs).

A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
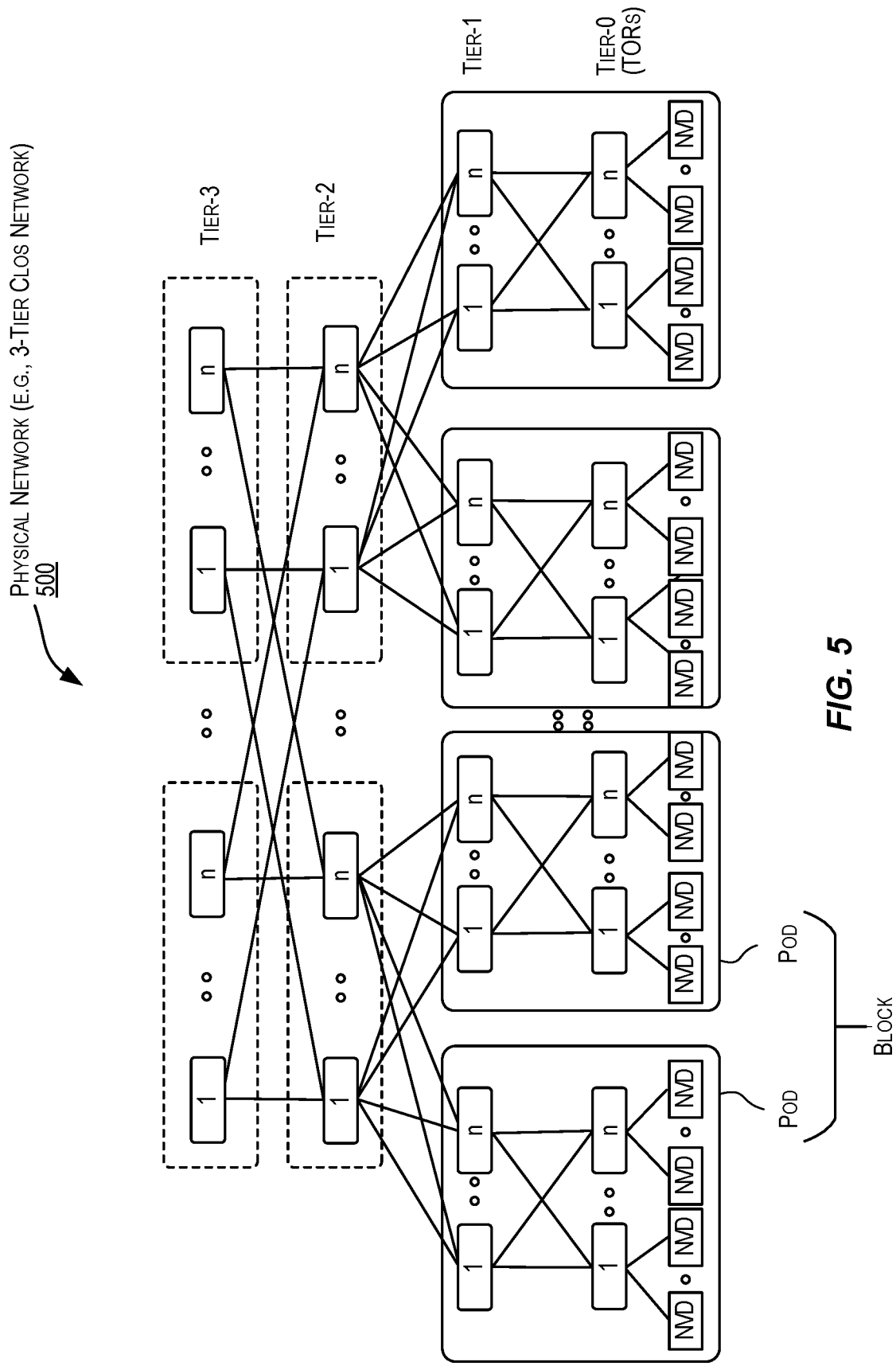
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
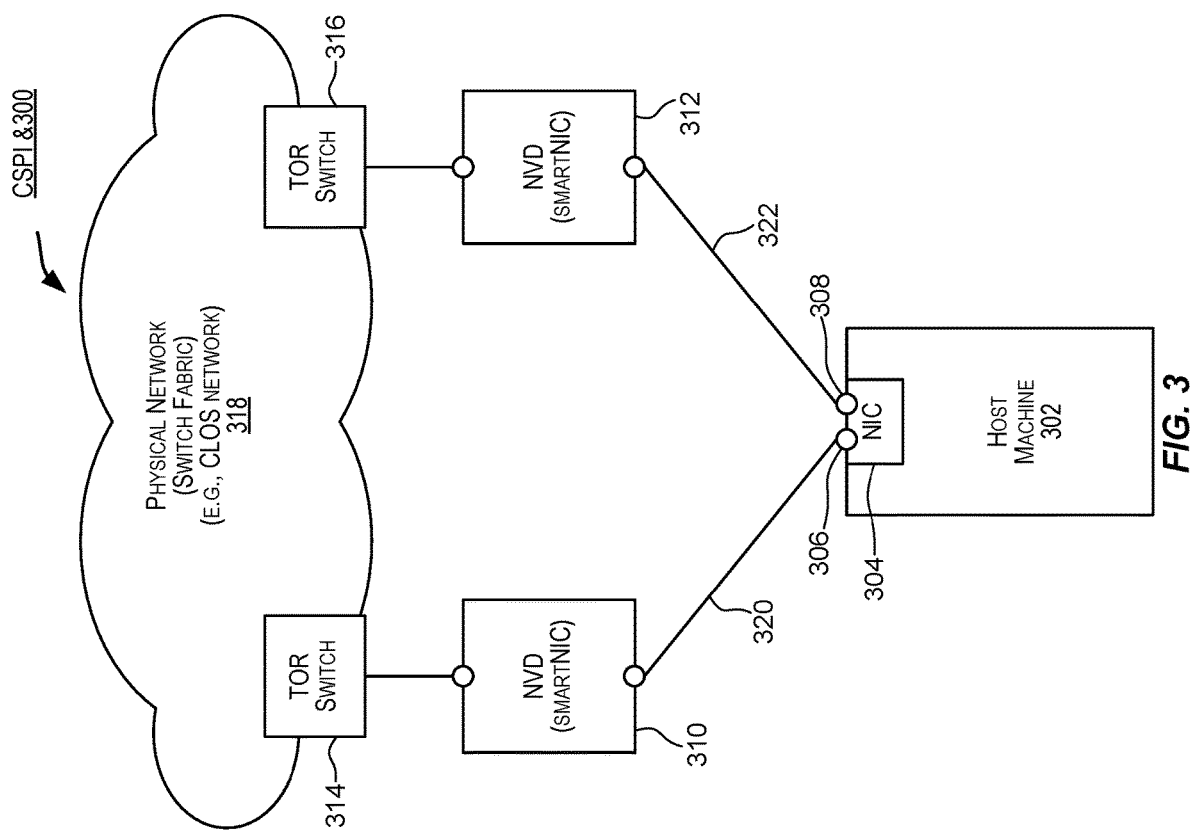
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320 and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch, or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two endpoints (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 12, 13, 14, and 15 (see references 1216, 1316, 1416, and 1516) and described below. Examples of a VCN Data Plane are depicted in FIGS. 12, 13, 14, and 15 (see references 1218, 1318, 1418, and 1518) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206 and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer.

Communications between endpoints hosted by CSPI 200 may be performed over physical network 218. A compute instance may also communicate with endpoints that are not hosted by CSPI 200 or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
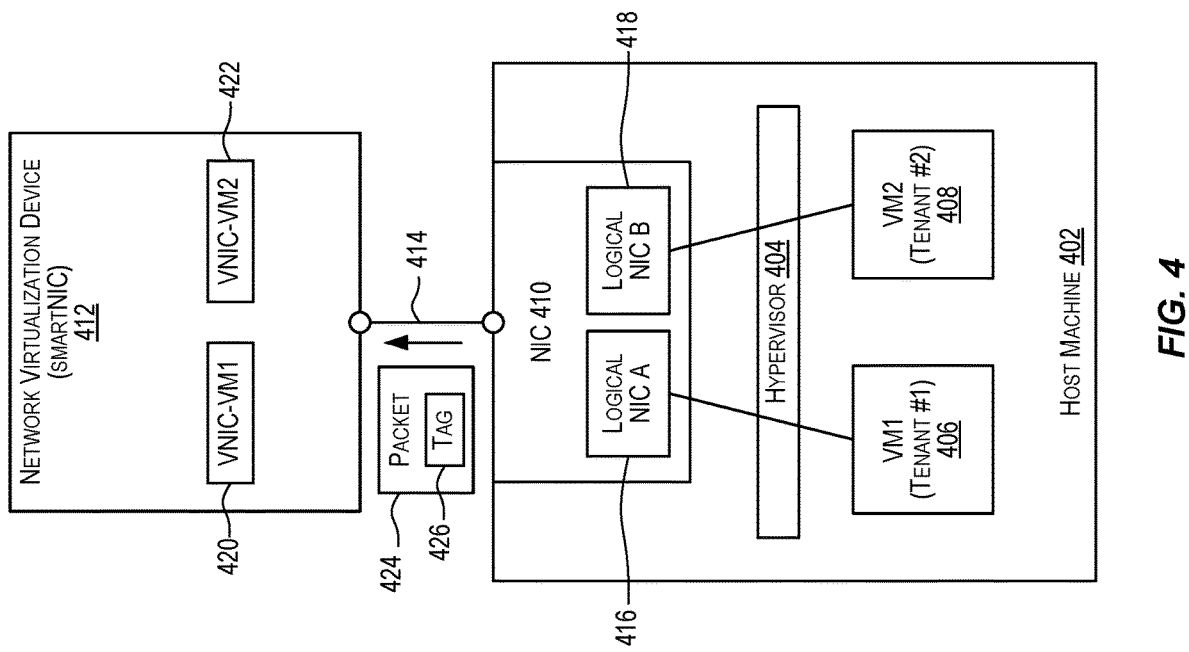
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multitenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION][.FUTURE USE].<UNIQUE ID> where, ocid1: The literal string indicating the version of the CID;

resource type: The type of resource (for example, instance, volume, VCN, subnet, user, group, and so on);

realm: The realm the resource is in. Example values are "c1" for the commercial realm, "c2" for the Government Cloud realm, or "c3" for the Federal Government Cloud realm, etc. Each realm may have its own domain name;

region: The region the resource is in. If the region is not applicable to the resource, this part might be blank;

future use: Reserved for future use. unique ID: The unique portion of the ID. The format may vary depending on the type of resource or service.

Hybrid GPU Architecture (GPU Supercluster)

Figure 6A:
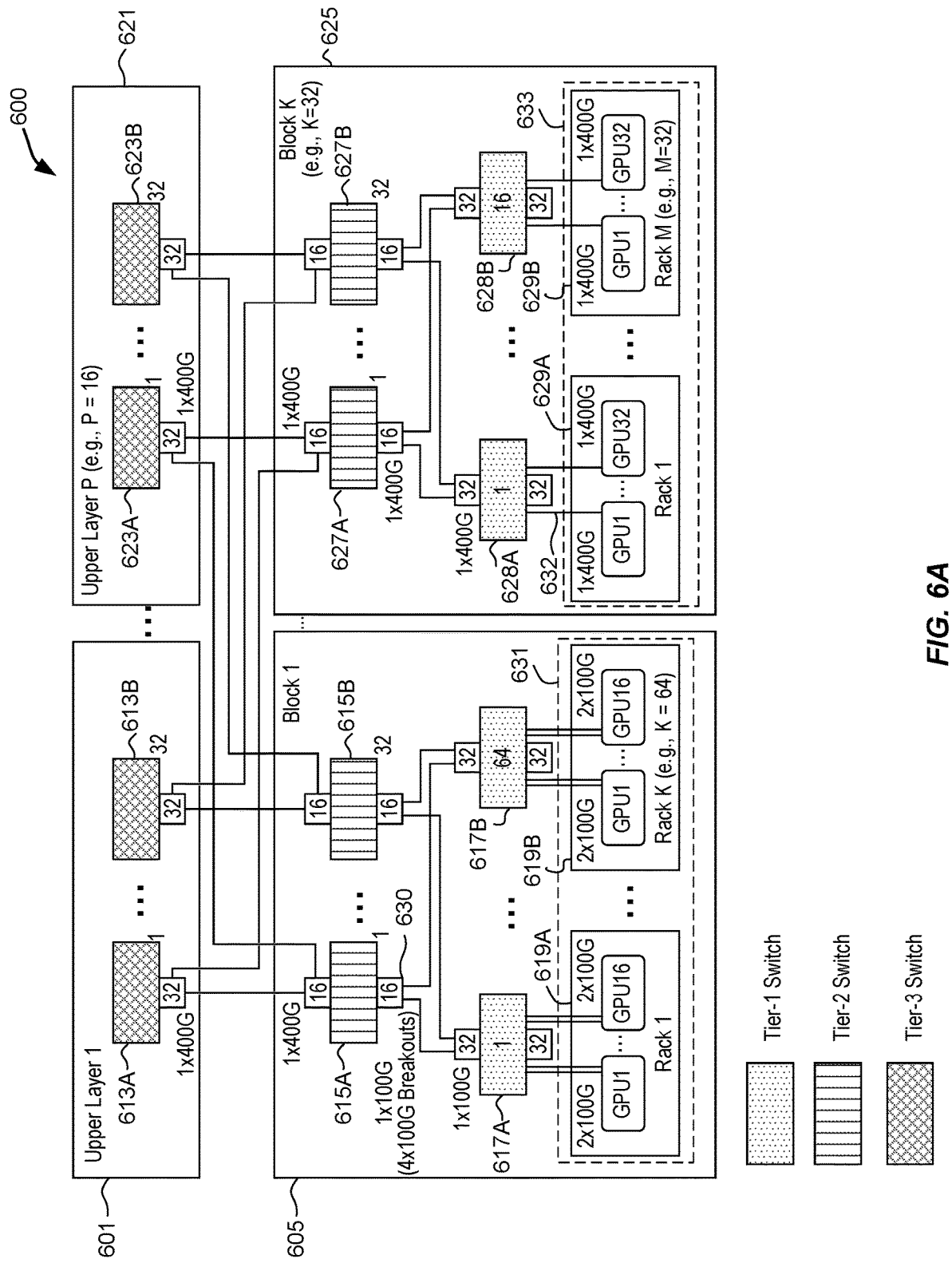
FIG. 6A depicts an architecture of a hybrid GPU cluster according to certain embodiments.

FIG. 6A depicts an architecture of a hybrid general processing unit (GPU) cluster according to some embodiments. The hybrid GPU cluster includes a plurality of GPU clusters that are communicatively coupled to one another via a hierarchical structure of switches (e.g., a CLOS architecture of switches arranged in a tiered manner). It is noted that the CLOS architecture enables scaling of GPUs to ranges much larger than traditional GPU clusters. The hybrid GPU architecture enables multiple GPU clusters to coexist in a same network fabric-referred to herein as a GPU fabric. In some implementations, at least some of the GPU clusters operate at speeds that are different than operating speeds of some other GPU clusters included in the hybrid GPU architecture. For example, the hybrid GPU cluster may include one or more GPU clusters operating at 100 G, and one or more GPU clusters operating at 400 G. The hybrid GPU cluster architecture of FIG. 6A is also referred to herein as a GPU supercluster architecture.

The GPU supercluster architecture 600 includes a plurality of blocks that host a plurality of GPU clusters. For instance, as shown in FIG. 6A, the GPU supercluster architecture 600 includes 'K' blocks (e.g., block 1, 605 to block K, 625), where each block is configured to host a particular GPU cluster. A first block (e.g., block 1 605) hosts a first GPU cluster 631, whereas a $K^{th}$ block (i.e., block K 625) hosts a second GPU cluster 633. It is noted that each GPU cluster included within a block is hosted on one or more racks. For example, the first GPU cluster 631 includes a first set of GPUs that are hosted on one or more racks (e.g., rack 1 (619A) to rack K (619B)). Similarly, the second GPU cluster 633 includes a second set of GPUs that are hosted on one or more racks (e.g., rack 1 (629A) to rack M (629B)).

According to some embodiments, the first GPU cluster 631 is a GPU cluster that operates at a first speed (e.g., 100 G). More specifically, the first GPU cluster 631 includes one or more GPUs (i.e., the first set of GPUs), where a network link from the GPU operates at the first speed. In other words, in a host machine a GPU card is paired with a network interface card (NIC), it is the NIC that operates at the first speed. Similarly, the second GPU cluster 633 is a GPU cluster that operates at a second speed (e.g., 400 G). Specifically, the second GPU cluster 633 includes one or more GPUs (i.e., the second set of GPUs), where the second speed is different than the first speed.

The CLOS architecture includes a tiered or hierarchical structure of switches including a first tier of switches (T1), a second tier of switches (T2), and a third tier of switches (T3). In one implementation, the first tier of switches and the second tier of switches are each included in the blocks of the supercluster architecture. For example, as shown in FIG. 6A, block 1 605 includes a plurality of first tier switches 617A-617B, whereas block K 625 includes a plurality of first tier switches 628A-628B. In a similar manner, block 1 605 includes a plurality of second tier switches 615A-615B, whereas block K 625 includes a plurality of second tier switches 627A-627B. The network fabric further includes a third tier of switches. In some implementations, the switches in the third tier may be partitioned to form groups of third tier of switches e.g., switches in group labeled 601 (i.e., switches 613A to 613B), and switches in group labeled 621 (i.e., switches 623A to 623B), respectively. It is noted that switches in the third-tier are also referred to herein as upper layer switches. Each group of switches in the third tier of switches communicatively couples the blocks as described below.

In some implementations, the tiered/hierarchical level of switches are arranged as follows: (i) a Tier 3 (or upper-layer switches) that have ports operating at the second speed e.g., 400 G. As such, these switches (e.g., switches 613A, 613B, 623A, and 623B) can support 100 G, 200 G, or 400 G switches being attached to it, (ii) a Tier 2 (or mid-level switches e.g., switches 615A, 615B, 627A, and 627B) that are configured to support 400 G connections either as 4×100 G connections (i.e., multiple 100 G connections) or 1×400 G connection (i.e., a single 400 G connection); and (iii) a Tier 1 (or bottom-level switches e.g., switches 617A, 617B, 628A, and 628B), wherein a type of switch that is to be deployed is selected based on a type of GPU cluster that these switches are expected to be connected to. For example, if one desires to connect a rack of GPUs, where each GPU is operating at 100 G speed (e.g., GPUs in cluster 1 631), then the Tier-1 switch selected is a 100 G switch, whereas if one desires to connect a rack of GPUs, where each GPU is operating at 400 G speed (e.g., GPUs in cluster 633), then the Tier-1 switches selected are 400 G switches.

As stated previously, the fabric of the GPU supercluster is arranged as a plurality of blocks, where each block supports a GPU cluster operating at a certain speed. The GPU supercluster includes at least a first GPU cluster operating at a first speed and a second GPU cluster that operates at a second speed that is different than the first speed. In each block, the Tier 1 switches are communicatively coupled (at one end) to the cluster of GPUs that are hosted on one or more racks and are coupled (at the other end) to the Tier 2 switches. In turn, the Tier 2 switches communicatively couple the Tier 1 switches to Tier 3 switches. The Tier 3 switches are configured to couple the different blocks together i.e., they communicatively couple the different clusters of GPUs.

Referring to FIG. 6A, block 1 605 includes K Tier-1 switches (e.g., K=64 switches) e.g., switches labeled 617A-617B, where each Tier-1 switch has M upstream ports (i.e., ports facing Tier-2 switches) and M downstream ports (i.e., ports facing the GPU racks), e.g., M=32 ports. Each upstream and downstream port of these Tier-1 switches operates at a first speed e.g., 100 G (as these switches are coupled to the GPU cluster 631 that operates at the first speed of 100 G). The downstream ports of the Tier-1 switches are coupled to the GPU racks. For instance, a particular Tier-1 switch (e.g., switch 617A) in block 1 605 is coupled to a rack of GPUs (619A) whereas switch 617B is coupled to rack 619B. The M downstream ports of switch 617A are communicatively coupled to the rack (619A), which includes P GPUs (e.g., P=M/2), where each GPU is connected to the switch via two links (i.e., utilizes two ports of the switch 617A), thereby providing a pair of 2×100 G connections.

The M upstream ports of switch 617A (e.g., M=32 ports) are communicatively coupled to M Tier-2 switches (e.g., switches 615A, 615B). It is noted that the Tier-2 switches have a dimension of P downstream ports and P upstream ports (e.g., P=16), where each port operates at a second speed e.g., 400 G (i.e., different that the operating speed of the upstream ports of the Tier-1 switches). For example, as shown in FIG. 6A, switch 615A has P=16 downstream ports labeled 630. In this case, each downstream port of a Tier-2 switch (e.g., switch 615A) that operates at 400 G is split (e.g., optically) into multiple (e.g., four) 100 G ports (referred to herein as sub-ports). Thereafter, each sub-port that operates at 100 G can be communicatively coupled to a corresponding upstream port of the Tier-1 switch (which operates at 100 G). It is appreciated that the splitting of downstream ports of the Tier-2 switches may be accomplished via an optical module connector, which possesses a break out function that has the ability to evenly distribute a large bandwidth at one end into several low speed connections at the other end. The P upstream ports of switch 615A (Tier-2) that each operate at 400 G are communicatively coupled to P=16 Tier-3 switches. For example, as shown in FIG. 6A, the P=16 upstream ports of switch 615A are communicatively coupled to a first Tier-3 switch in each group/upper layer switches e.g., switch 613A (in upper layer 1) and switch 623A (in upper layer P).

Turning now to block K 625, there are included M Tier-2 switches (e.g., switches 627A, 627B), each of which have a dimension of P upstream ports and P downstream ports (e.g., P=M/2). Each of these switches have ports that operate at the second speed. The upstream ports of the Tier-2 switches in block K 625 are communicatively coupled to the Tier-3 switches in manner similar to that as the coupling of the Tier-2 switches and Tier-3 switches of block 1 605. However, the P downstream ports of the Tier-2 switches are communicatively coupled to P Tier-1 switches. Specifically, in contrast to the coupling as described above with respect to the downstream ports 630 of the Tier-2 switch 615A (of block 1), the downstream ports of the Tier-2 switches in block K do not require any form of splitting.

Figure 6B:
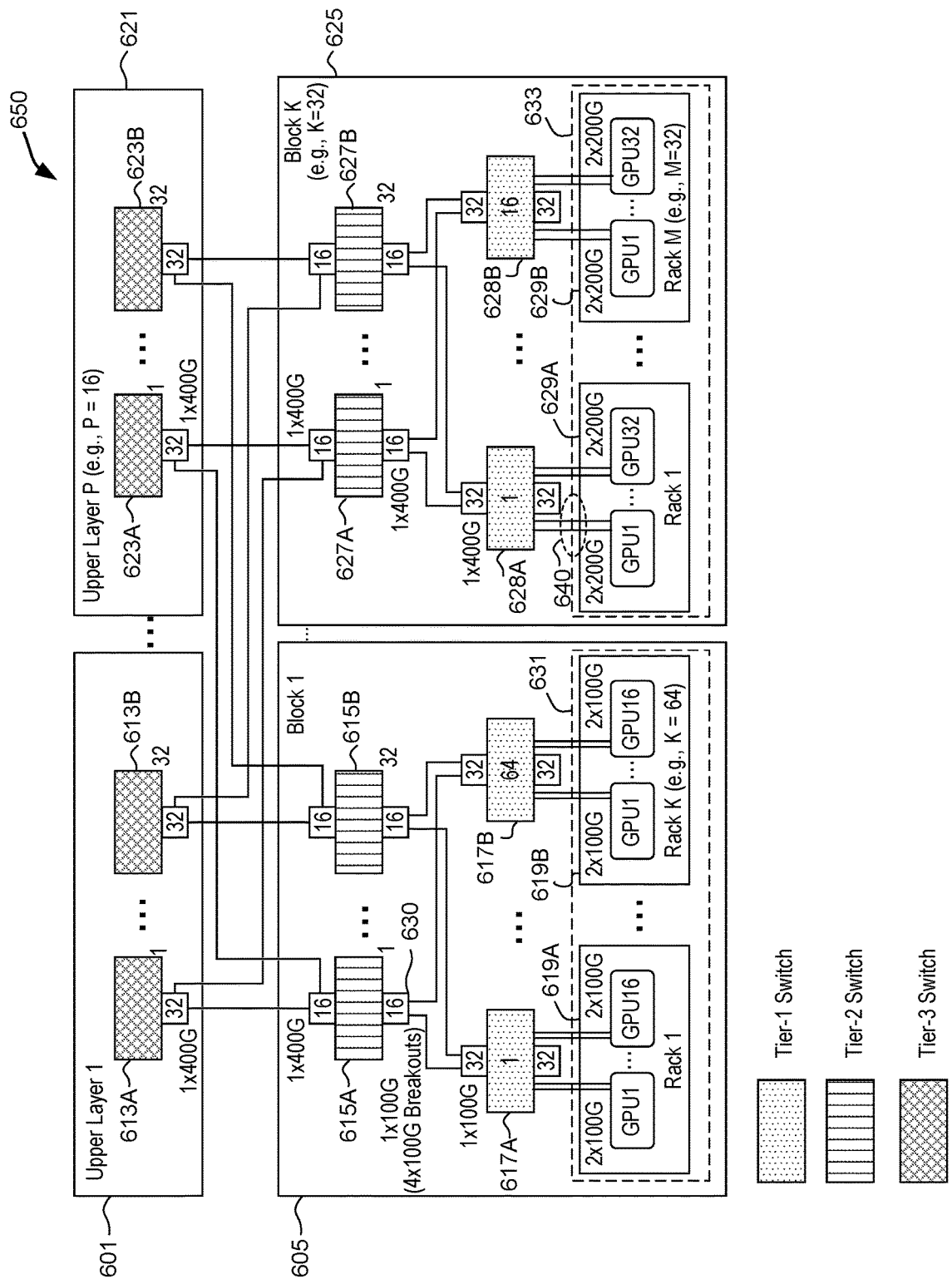
FIG. 6B depicts another architecture of the hybrid GPU cluster according to certain embodiments.

According to some embodiments, the coupling of the downstream ports of the Tier-1 switches in block K 625 to the GPU cluster 633 hosted on racks 629A-629B can be in one of two forms. In one implementation, and as shown in FIG. 6A, for a particular Tier-1 switch (e.g., switch 628A), the M downstream ports of the switch are connected to M GPUs hosted in a rack. Thus, there is a one-to-one correspondence between a downstream port of the switch and a GPU hosted in a rack. It is noted that such a coupling provides for a single connection 632 between the GPU hosted in a rack and a downstream port of the switch 628A. In another implementation 650 (as shown in FIG. 6B), with an aim to provide more flexibility to a host, a link aggregation technique (e.g., link bonding) is utilized, wherein for instance, a single 400 G interface of a port of the switch 628A is presented as two distinct links (labeled as 640 in FIG. 6B) to an application that is executed on a GPU hosted on rack 629A. Thus, the above described implementations provide for the functionality of presenting to an application executed on a GPU, one of a 1×400 G link (i.e., single connection) or 2×200 G links (i.e., a bond or multiple connections).

Thus, as described above the supercluster architecture(s) of FIGS. 6A and 6B deliver ultra-high performance at enhanced scales. The multi-tier CLOS topology provides for a non-blocking network fabric that can scale to tens of thousands of GPUs. It is noted that while a traditional GPU cluster may fit within a few rows e.g., in one room of a datacenter, the large-scale supercluster can span multiple rooms (i.e., data-halls) within a building or even multiple adjoining buildings in a datacenter complex. The cable distance between two GPUs may be longer, which may result in some packets going across these data-halls and incurring slightly higher latency. Techniques are discussed below with reference to FIGS. 9-12 to counteract the potential higher latency that may be incurred. Furthermore, it is appreciated that the architectures described above with reference to FIGS. 6A and 6B are merely examples and are not intended to be limiting the scope of the present disclosure. Variations, alternatives, and modifications are possible in alternative embodiments. For example, in some implementations, the architectures may have more or fewer systems or components than those shown in FIGS. 6A and 6B, may combine two or more systems, or may have a different configuration (e.g., switch dimensions, number of tiered layers in the CLOS topology, number of blocks, types (i.e., speeds) of GPU clusters, etc.,) or arrangement of systems. The systems, subsystems, and other components depicted in FIGS. 6A and 6B may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 7:
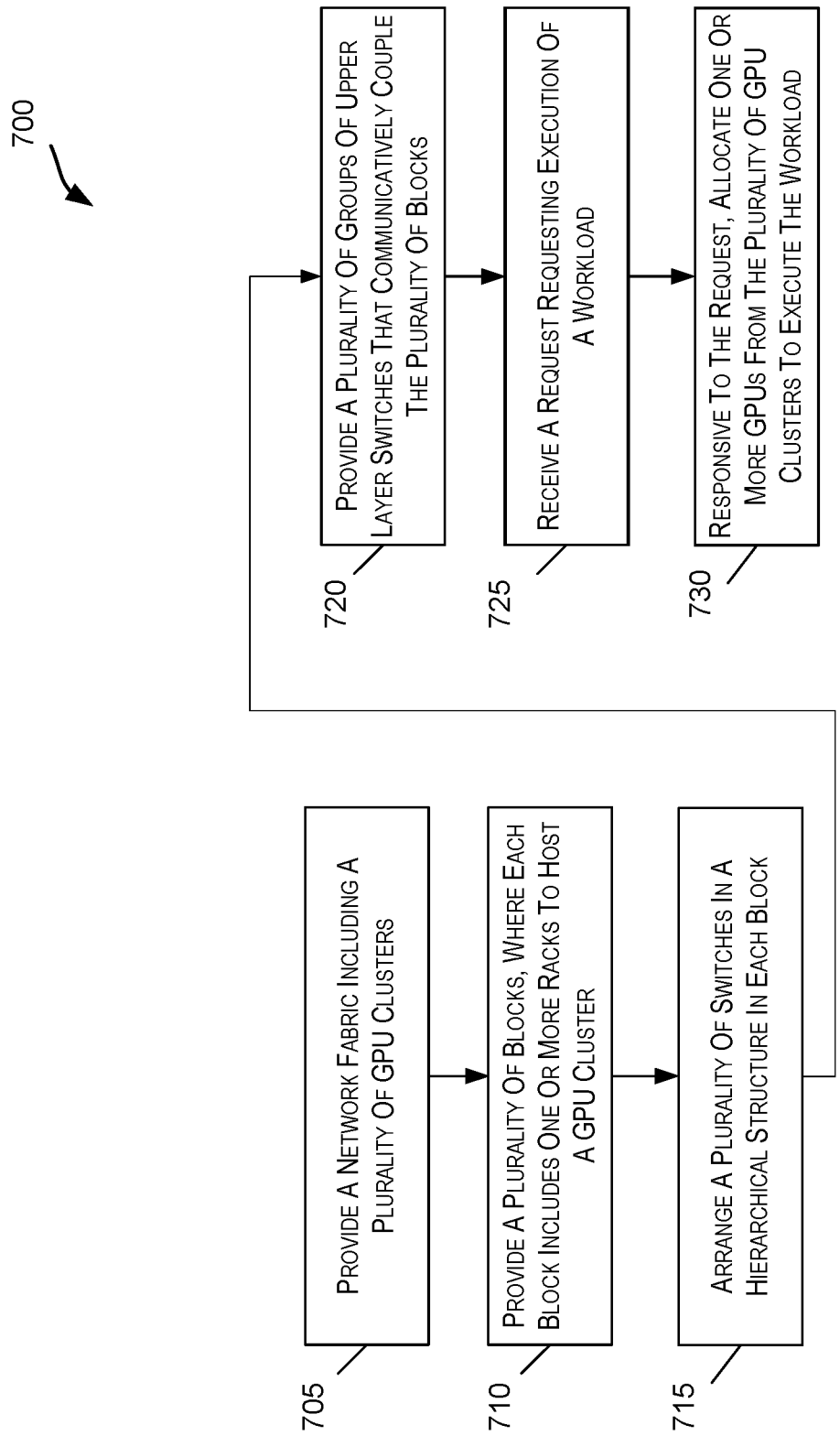
FIG. 7 illustrates an exemplary flowchart depicting steps performed in provisioning a request using the hybrid GPU cluster, according to certain embodiments.

FIG. 7 illustrates an exemplary flowchart 700 depicting steps performed in provisioning a request using the hybrid GPU cluster. The processing depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 7 and described below is intended to be illustrative and non-limiting. The steps depicted in FIG. 7 may be performed by a control plane of the network fabric. Although FIG. 7 depicts the various processing steps occurring in a particular sequence or order, this is not intended to be limiting. In certain alternative embodiments, the steps may be performed in some different order or some steps may also be performed in parallel.

The process commences in step 705, wherein a network fabric is provided, where the network fabric includes a plurality of GPU clusters. Each GPU cluster includes one or more GPUs that are hosted on one or more racks. The plurality of GPU clusters includes at least a first GPU cluster that operates at a first speed and a second GPU cluster that operates at a second speed (that is different from the first speed). In some implementations, the providing of the network fabric of step 705 may include sub-steps 710-720 as described below.

In step 710, a plurality of blocks are instantiated, where each block includes one or more racks to host GPUs that belong to a particular GPU cluster. It is noted that a single GPU cluster is housed within a block. Thus, a first block may host the first GPU cluster operating at the first speed and a second block may host the second GPU cluster operating at the second speed. In step 715, a plurality of switches are arranged in a hierarchical manner (i.e., the CLOS architecture). In some implementations, the hierarchical structure of switches may correspond to a three-tiered switch architecture. In this case, switches belonging to tier 1 and 2 may be provided in each block of the network fabric as depicted in FIG. 6A. In step 720, a plurality of groups of upper layer switches may be provided. Note that this layer of switches may correspond to a Tier-3 layer of switches in the CLOS architecture. The Tier-3 layer of switches communicatively couple the different blocks included in the network fabric. In step 725, a request may be received by the control plane of the network fabric. The request may correspond to a customer's request for execution of a workload. In response to receiving the request, in step 730, the control plane may allocate one or more GPUs (based on constraints associated with the request) from the plurality of GPU clusters to execute the workload.

Figure 8:
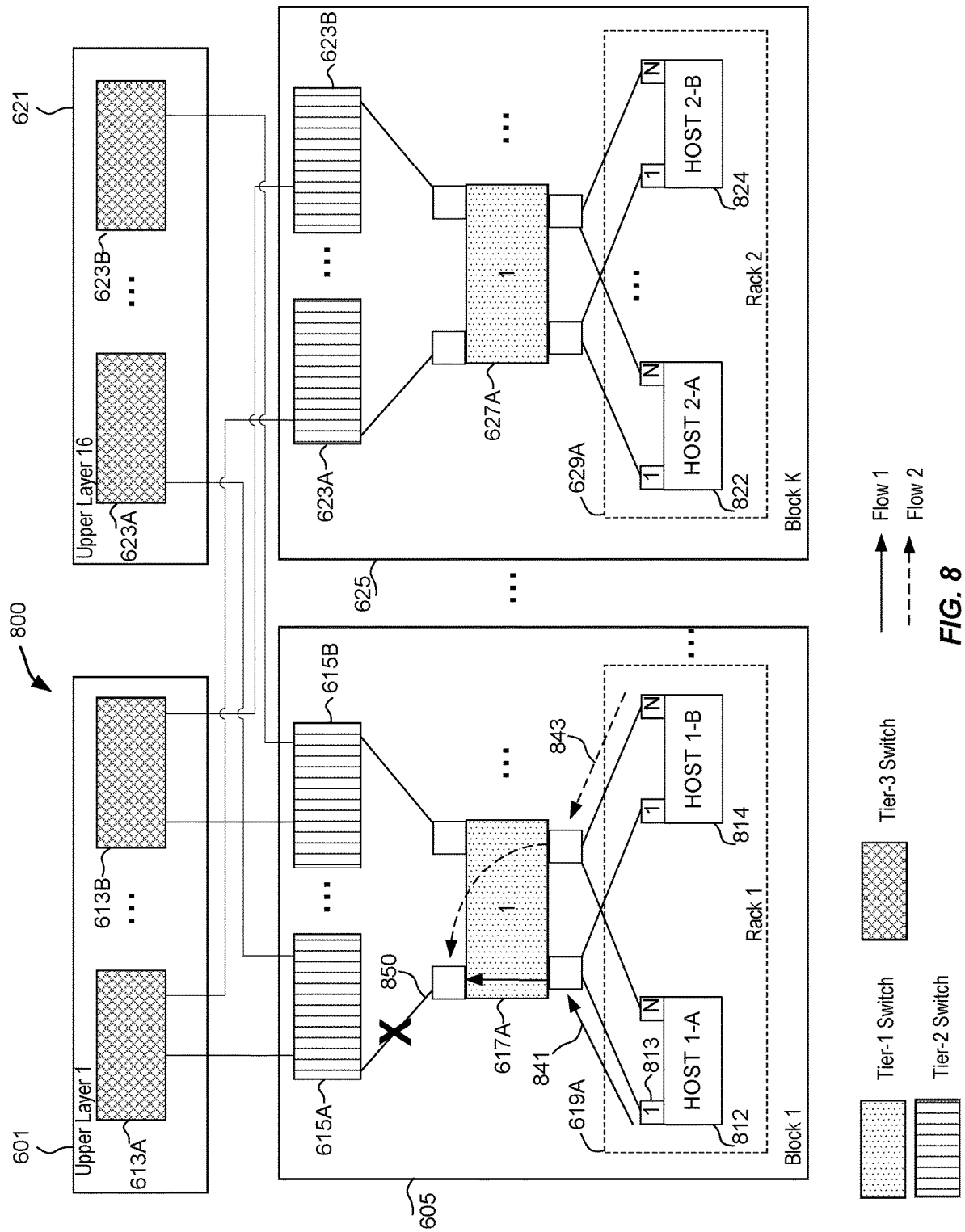
FIG. 8 depicts a simplified block diagram of a cloud infrastructure incorporating a CLOS network arrangement, according to certain embodiments.

FIG. 8 depicts a block diagram of a cloud infrastructure 800 incorporating a CLOS network arrangement of switches, according to certain embodiments. The cloud infrastructure 800 includes a plurality of blocks e.g., block 1 605-block K 625. Each block may include a plurality of racks, wherein each rack hosts a plurality of host machines (also referred to herein as hosts). For sake of simplicity, the blocks depicted in FIG. 8 are illustrated to include a single rack. However, it is noted that the blocks may include multiple racks. Block 1 includes rack 619A that is depicted as including two host machines i.e., Host 1-A 812 and Host 1-B 814. Similarly, block K 625 includes rack 629A that is depicted as including two other host machines i.e., Host 2-A 822 and Host 2-B 824. It is appreciated that in the illustration of FIG. 8 (i.e., each rack including two host machines) is intended to be illustrative and non-limiting. For instance, the cloud infratsructure may include more than two racks, where each rack may include more than two host machines. Moreover, it is noted that each rack is not constraint to have the same number of hosts. Rather, a rack may have a higher or lower number of host machines as compared to the number of host machines included in another rack.

Each host machine includes a plurality of graphical processing units (GPUs). For instance, host machine 1-A 812 includes N GPUs e.g., GPU 1, 813. Moreover, it is appreciated that the illustration in FIG. 8 of having each host machine including the same number of GPUs, i.e., N GPUs, is intended to be illustrative and non-limiting i.e., each host machine can include a different number of GPUs. Each rack is associated with a Tier-1 switch (also referred to herein as a top of rack (TOR) switch) that is communicatively coupled with the GPUs hosted on the host machines within the rack. For example, rack 1 619A is associated with a TOR switch 617A that is communicatively coupled to host machines Host 1-A, 812 and Host 1-B, 814, whereas rack 2 629A is associated with a TOR switch 627A that is communicatively coupled to host machines Host 2-A, 622 and Host 2-K, 624. It is appreciated that the TOR switches depicted in FIG. 6 (i.e., switches 617A, and 627A), each include N ports that are used to communicatively couple the TOR switch to the N GPUs hosted on each host machine included in the corresponding rack. The coupling of TOR switches to the GPUs as depicted in FIG. 8 is intended to be illustrative and non-limiting. For instance, in some embodiments, the TOR switch may have a plurality of ports, each of which corresponds to a GPU on each host machine i.e., a GPU on a host machine may be connected to a unique port of the TOR via a communication link.

The TOR switches associated with each rack are communicatively coupled to one or more Tier-2 switches in each block. For example, switch 617A is communicatively coupled to Tier-2 switches 615A-615B, whereas switch 627A is communicatively coupled to switches 623A-623B. Similar to the configuration of FIG. 6A, the Tier-2 switches are communicatively coupled to the upper layer switches 613A-613B and 623A-623B as shown FIG. 8. Information transmitted from a particular Tier-1 switch to a Tier-2 switch (or from a Tier-2 switch to a Tier-3 switch) is referred to herein as communication conducted via an uplink, whereas information transmitted from Tier-1 switch to a host machine (or from a Tier-3 switch to a Tier-2 switch) is referred to herein as communication conducted via a downlink. According to some embodiments, the tiered switches of FIG. 8 form a CLOS network arrangement (e.g., a multi-stage switching network), where each Tier-1 switch may be considered as forming a 'leaf' node in the CLOS network.

According to some embodiments, the GPUs included in the host machines execute tasks related to machine learning. In such a setting, a single task may be performed/spread across a large number of GPUs that could be spread across multiple host machines, across multiple racks, and/or across different blocks. Since all these GPUs are working on the same task (i.e., a workload), they all need to communicate with each other in a time synchronized manner. Furthermore, at any given time, the GPUs are either in one of a compute mode or a communication mode i.e., GPUs talk to one another at roughly the same time instant. The speed of the workload is determined by the speed of the slowest GPU.

Typically, to route packets from a source GPU to a destination GPU, equal cost multipath (ECMP) routing is utilized. In ECMP routing, when there are multiple equal cost paths available for routing traffic from a sender to a receiver, a selection technique is used to select a particular path. Accordingly, at a network device (e.g., a TOR switch) receiving the traffic, a selection algorithm is used to select an outgoing link to be used for forwarding the traffic from the network device to a subsequent device. This outgoing link selection occurs at each network device in the path from the sender to the receiver. Hash-based selection is a widely used ECMP selection technique, where the hash may be based, for example, on a 4-tuple of a packet (e.g., source port, destination port, source IP, destination IP).

ECMP routing is a flow aware routing technique, where each flow (i.e., a stream of data packets) is hashed to the same path for the duration of the flow. Thus, packets in a flow are forwarded from a network device using a particular outgoing port/link. This is typically done in order to ensure that packets in a flow arrive in order i.e., no re-ordering of packets is required. However, ECMP routing is bandwidth (or throughput) unaware. In other words, the switches perform statistical flow-aware (throughput unaware) ECMP load balancing of flows on parallel links.

In standard ECMP routing (i.e., only flow aware routing), a problem is that flows received by a network device over two separate incoming links may get hashed to the same outgoing link, thereby resulting in a flow collision. For instance, consider a situation where the two flows are coming in over two separate incoming 100 G links, and each of the flows gets hashed to the same 100 G outgoing link. Such a situation results in a congestion (i.e., flow collision) and results in packets being dropped, since the incoming bandwidth is 200 G, but outgoing bandwidth is 100 G. As shown in FIG. 8, there are two flows: flow 1 841 which is directed from a first GPU of the host machine Host 1-A, 812 to the switch 617A, and flow 2 843, which is directed from another GPU on the host machine Host 1-B, 814 to the switch 617A. Note that the two flows are directed to the switch on separate links. For sake of illustration, it is assumed that the links depicted in FIG. 8 have a same capacity (i.e., bandwidth) of 100 G. In the case when the switch 617A performs ECMP routing algorithm, it is possible that the two flows get hashed to use the same outgoing link of the switch e.g., link 850 that connects the switch 617A to a higher tier switch e.g., switch 615A. In this case, there is a collision between the two flows (represented by 'X' mark), which results in packets being dropped.

Such a collision scenario is generally problematic for all types of traffic irrespective of the protocol. For example, TCP is intelligent in that when a packet gets dropped and the sender does not get an acknowledgment for that dropped packet, the packet is re-transmitted. However, the situation is worsened for remote direct memory access (RDMA) type traffic. RDMA networks do not use TCP for a variety of reasons (e.g., TCP does not have a high performance). RDMA networks use protocols such as RDMA over Infiniband or RDMA over converged Ethernet (RoCE). In RoCE, there is a congestion control algorithm, wherein when a sender identifies the occurrence of a congestion or dropped packets, the sender slows down the transmission of packets. For a dropped packet, not only the dropped packets, but also several packets around the dropped packet are retransmitted that further eats away the available bandwidth and results in poor performance.

The flow collision issue is a critical problem for supercluster GPU architecture of FIG. 6A, due to the stringent time synchronization requirements. For example, as stated before, GPUs may execute a machine learning task (i.e., a workload) where all GPUs communicate with each other in a time synchronized manner. For machine learning tasks, and other types of tasks, a logical topology is constructed (e.g., a ring topology, a tree topology, etc.) for the host machines to enable communications between the GPUs. GPUs connect with each other using the logical topology which may be multilevel or multi-dimensional. In some implementations, in order to execute a workload, an application constructs a virtual (or logical) topology to interconnect the GPUs. Typically, such an application is unaware of the underlying physical topology of the host machines and thus attempts to construct the logical topology in a random (i.e., arbitrary) manner. Such randomly constructed logical topologies result in GPU host machines exchanging traffic without regard for which other GPU host(s) are in their local network neighborhood. As such, the likelihood for traffic congestion is increased which results in poor GPU throughput. For example, consider the case where a pair of host machines is required to execute a certain machine learning task. In this case, if a random selection of the pair of host machines is performed, where one of the host machines resides in a first local neighborhood (e.g., a first rack) and the other host machine resides in another local neighborhood (different than the first local neighborhood) e.g., a second rack, then the execution of the machine learning task would incur a certain amount of latency (e.g., delay incurred in communication between the first host machine and the second host machine), as well as may increase the likelihood of traffic congestion. In contrast, if the pair of host machines selected for executing the machine learning task reside in the same local neighborhood (e.g., reside in the same rack, or a same block), it is appreciated that communication between the host machines incurs minimal latency, as well as improves the likelihood of avoiding traffic congestion.

Described below are techniques to overcome the above described problems. Specifically, the techniques described herein utilize hierarchical locality information of the GPUs in the process of constructing the logical topology and thereby avoids needless traffic congestion. Moreover, embodiments of the present disclosure provide for customers to reduce their application to service latency by "placing" their workload(s) on nearby host machines. Further, customers may use the locality information and place their workloads in ways to get higher anti-affinity and thus gain higher resiliency by reducing shared fate of the resources.

According to some embodiments, host machines are unaware of the physical topology of the network i.e., a particular host machine is unaware of the physical location/ position of other host machines in the network. For example, referring to FIG. 8, host machine 1-A 812 is unaware that host machine 1-B 814 is in fact included in the same rack (i.e., rack 619A) and positioned behind the same TOR switch i.e., switch 617A. However, a network control plane is aware of the overall physical topology of the host machines. In one implementation, the network control plane publishes such locality information (e.g., a hierarchical locality information identifying at least a rack comprising the host machine, a block hosting the rack, etc.,) to the host machines in order to achieve traffic locality and avoid needless traffic congestion. Doing so has a significant impact on the performance of GPU workloads as illustrated below with reference to FIGS. 9 and 10.

By some embodiments, the network control plane utilizes an instance metadata service (IMDS) to publish (and store) metadata information (e.g., hierarchical locality information) to a host machine. Such metadata information may be published to the host machine(s) via a network virtualization device (NVD) associated with the host machine(s). It is appreciated that hierarchical locality information may include metadata indicating a rack identifier of the rack comprising the host machine as well as a block identifier of the block hosting the rack. It is appreciated that each of the host machines may query the IMDS to obtain the metadata information associated with the host machine. As is described below, the published locality information is utilized to construct optimal logical topologies to achieve higher GPU workload throughputs.

Figure 9:
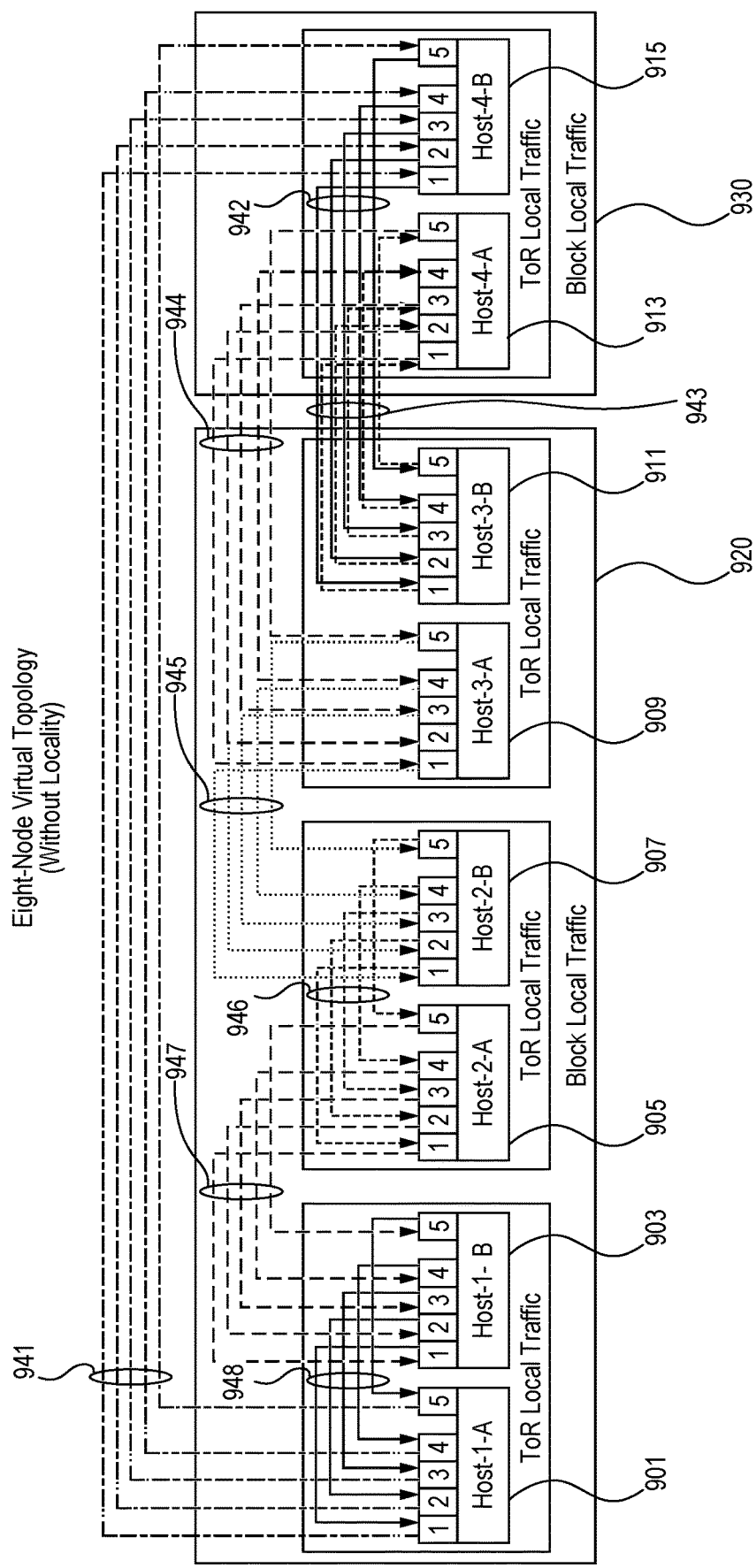
FIG. 9 depicts a logical topology constructed without locality information, according to certain embodiments.

Turning to FIG. 9, there is depicted a logical topology that is constructed without considering locality information of the host machines, according to certain embodiments. The logical topology depicted in FIG. 9 corresponds to a scenario of having eight host machines i.e., Host machine 1-A 901, Host machine 1-B 903, Host machine 2-A 905, Host machine 2-B 907, Host machine 3-A 909, Host machine 3-B 911, Host machine 4-A 913, and Host machine 4-B 915. As shown in FIG. 9, it is noted that Host machines 1-A 901 and 1-B 903 are located in the same rack i.e., positioned behind a same TOR switch. Similarly, the pair of host machines: (Host machines 2-A 905 and 2-B 907), (Host machines 3-A 909 and 3-B 911), and (Host machines 4-A 913 and 4-B 915) are respectively included in other racks, respectively. This is represented in FIG. 9 as 'TOR local traffic'. Further, it is noted that host machines 1-A, 1-B, 2-A, 2-B, 3-A, and 3-B are included in the same block (i.e., different racks in the same block), whereas host machines 4-A and 4-B are located in another block. This is represented in FIG. 9 as 'Block local traffic'.

The logical topology depicted in FIG. 9 is a ring topology that is constructed without hierarchical locality information i.e., the ring topology is constructed in a random (arbitrary) manner. As shown in FIG. 9, the ring is constructed in a manner such that Host 1-A is directly connected to Host 4-B via the links labeled 941. Further, Host 4-B is connected to Host 3-B via the links labeled 942, Host 3-B is connected to Host 4-A via links labeled 943, Host 4-A is connected to Host 3-A via links labeled 944, Host 3-A is connected to Host 2-B via links labeled 945, Host 2-B is connected to Host 2-A via links labeled 946, Host 2-A is connected to Host 1-B via links labeled 947, and Host 1-B is connected to Host 1-A via links labeled 948.

The logical topology constructed in the manner as shown in FIG. 9 is prone to network flow collisions occurring due to ECMP traffic distribution. It is noted that although Host 4-A 913 and Host 4-B 915 are positioned behind the same TOR switch i.e., included in the same rack, the traffic originating from Host 4-B and destined for Host 4-A traverses the following route: traffic is first routed from Host 4-B to Host 3-B (i.e., via the virtual links 942), and then from Host 3-B to Host 4-A (i.e., via virtual links 943). Thus, traffic intended for a destination host (e.g., Host 4-A) that is positioned in the same rack as the origination host (i.e., Host 4-B) is unnecessarily routed to a host machine (i.e., Host 3-B) that not only lies outside the rack but is located in a completely different block (as compared to the source and destination host machines). In other words, traffic which could have been routed locally within the block 930 is routed to a host machine outside the block, only to be re-routed back into block 930. This occurs due to the arbitrarily constructed logical topology of FIG. 9, which leads to increased likelihood of flow collisions, which in turn reduces the throughput of GPU workloads (e.g., higher latency, jitter loss, etc.).

Figure 10:
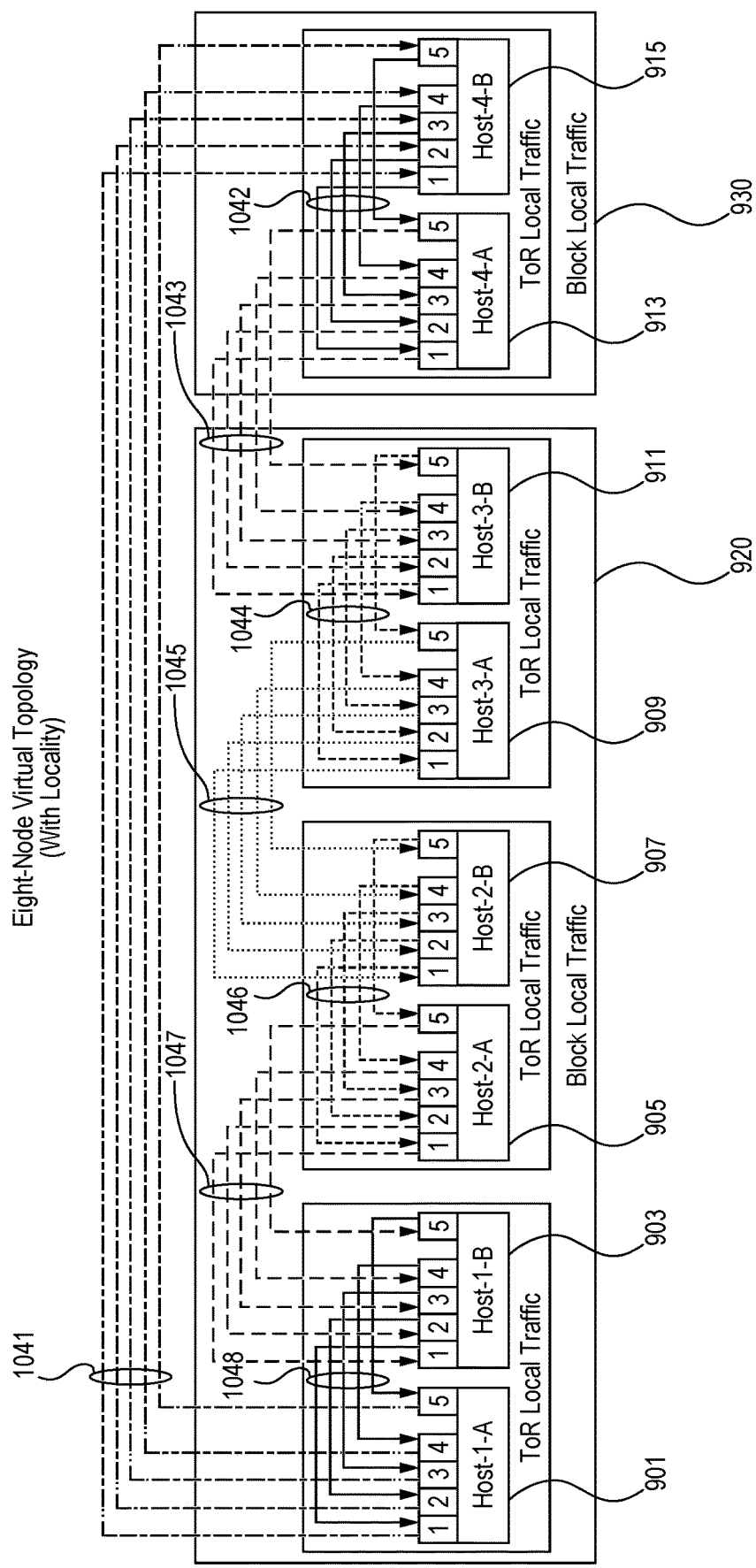
FIG. 10 depicts a logical topology constructed with locality information, according to certain embodiments.

Turning now to FIG. 10, there is depicted another logical topology that is constructed considering hierarchical locality information of the host machines, according to certain embodiments. The logical topology depicted in FIG. 10 corresponds to the same eight host machines as those depicted in FIG. 9. The logical topology depicted in FIG. 10 is a ring topology that is constructed utilizing hierarchical locality information i.e., the ring topology is constructed based on hierarchical locality information obtained, for example, from IMDS. By some embodiments, the logical topology may be constructed by a configuration host machine which may be one of the host machines depicted in FIG. 10. As shown in FIG. 10, the ring is constructed in a manner such that: Host 1-A is directly connected to Host 4-B via the links labeled 1041. Further, Host 4-B is connected to Host 4-A via the links labeled 1042, Host 4-A is connected to Host 3-B via links labeled 1043, Host 3-B is connected to Host 3-A via links labeled 1044, Host 3-A is connected to Host 2-B via links labeled 1045, Host 2-B is connected to Host 2-A via links labeled 1046, Host 2-A is connected to Host 1-B via links labeled 1047, and Host 1-B is connected to Host 1-A via links labeled 1048.

Figure 11:
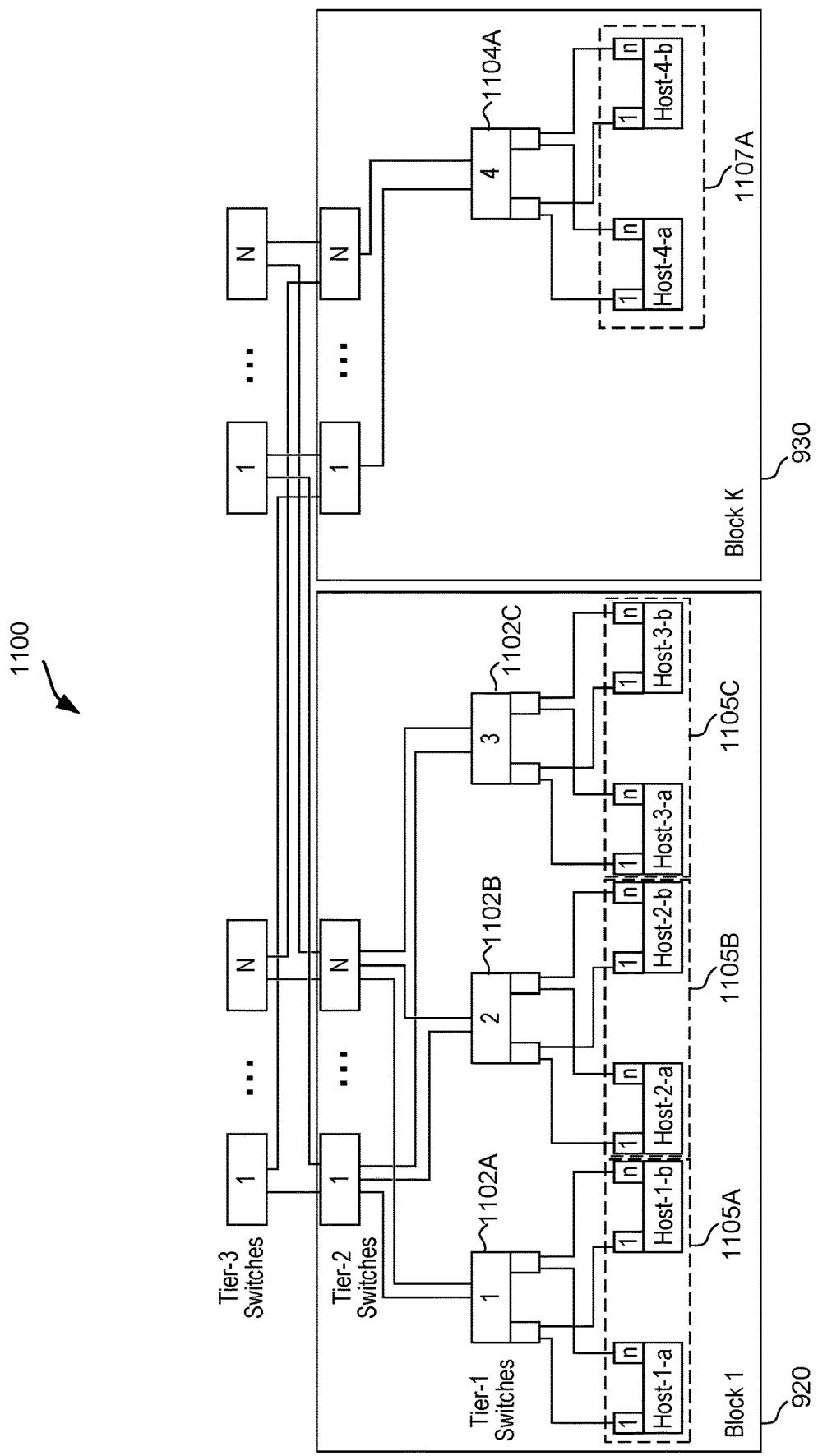
FIG. 11 depicts a simplified block diagram of the hybrid GPU cluster illustrating locality of network components according to some embodiments.

The logical topology depicted in FIG. 10 avoids traffic between two host machines that are in the same rack (i.e., positioned behind the same TOR switch) from being routed unnecessarily outside the rack and/or block. For instance, considering the same example of FIG. 9, where Host 4-B intends to send traffic to Host 4-A, the traffic can be routed (over a single hop in the virtual layer) via the links 1042. This is in contrast to the situation depicted in FIG. 9, where traffic was routed outside the block (i.e., to Host 3-B) and then re-routed back to the block (i.e., to Host 4-A). FIG. 11 depicts a physical topology 1100 of the eight nodes considered the above examples of FIG. 9 and FIG. 10. Specifically, Host 1-A and Host 1-B are depicted to be included in the same rack 1105A (connected by Tier-1 switch 1102A), Host 2-A and Host 2-B are depicted to be included in the same rack 1105B (connected by Tier-1 switch 1102B), Host 3-A and Host 3-B are depicted to be included in the same rack 1105C (connected by Tier-1 switch 1102C), and Host 4-A and Host 4-B are depicted to be included in the same rack 1107A (connected by Tier-1 switch 1104A). It is noted that the Tier-1 switches 1102A, 1102B, and 1102C are located in the same block 920, whereas the Tier-1 switch 1104A is located in another block 930. In this manner constructing the logical topology based on hierarchical locality information leads to a reduced likelihood of flow collisions, which increases the throughput of GPU workloads.

Figure 12:
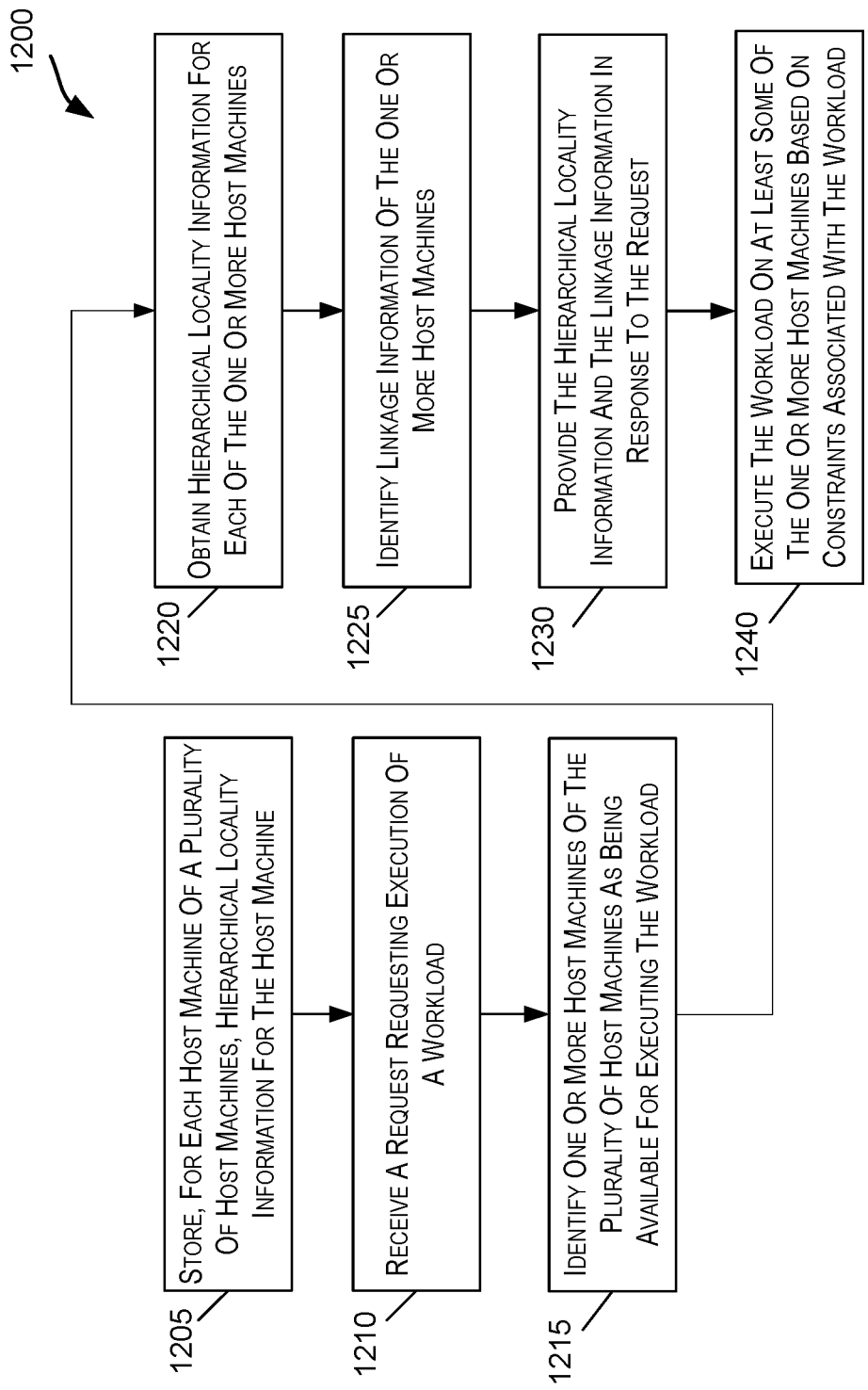
FIG. 12 illustrates an exemplary flowchart depicting steps performed in provisioning a request using locality information, according to certain embodiments.

FIG. 12 illustrates an exemplary flowchart 1200 depicting steps performed in provisioning a request using hierarchical locality information, according to certain embodiments. The processing depicted in FIG. 12 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 12 and described below is intended to be illustrative and non-limiting. Although FIG. 12 depicts the various processing steps occurring in a particular sequence or order, this is not intended to be limiting. In certain alternative embodiments, the steps may be performed in some different order or some steps may also be performed in parallel.

The process commences in step 1205, where for each host machine of a plurality of host machines (e.g., host machines included in a GPU cluster) hierarchical locality information for the host machine is stored. Hierarchical locality information for a host machine includes information identifying for instance, a rack comprising the host machine, a block in which the rack is disposed, etc. By some embodiments, the instance metadata service may be utilized to store the hierarchical locality information in the host machine via a network virtualization device (NVD) associated with the host machine. It is noted that hierarchical locality information may correspond to information that indicates for example, an identifier of a rack (i.e., rack ID) which includes the host machine, an identifier of a TOR switch associated with the rack, a block identifier (i.e., block ID) of the block in which the rack is located etc.

In step 1210, a control plane receives a request (e.g., from a customer) requesting execution of a workload. Note that a workload corresponds to one or more processes that are to be executed using the GPUs associated with the host machines. The process then moves to step 1215, where one or more host machines from the plurality of host machines are identified as being available for executing the workload. The identification of available host machines may be performed in several ways. For instance, by one embodiment, the control plane may maintain a current load (i.e., processing workload) handled by a host machine. Based on a capacity of each host machine and the amount of current load handled by the host machine, the control plane may select one or more host machines that are available for executing the workload of the customer. Additionally, by another embodiment, the control plane may pre-allocate a certain number of host machines per customer. Further, the available host machines may be determined from this certain number of host machines.

According to some embodiments, the request received in step 1210 may include one or more constraints. For instance, the request can include a first constraint associated with a latency threshold i.e., the customer may desire the workload to be executed by having the latency be lower than a predetermined threshold value. A second constraint may correspond to an anti-affinity constraint. Such a constraint corresponds to the customer desiring to have a certain degree of availability of the host machines i.e., at least some of the host machines selected for executing the workload need to be positioned in different racks and/or different blocks. Such a constraint is typically incorporated by the customer to address failure of rack issues. Additionally, the customer's request may include constraints directed to the type of GPUs required to execute the workload. For instance, the request may indicate that the customer desires a first number of GPUs that operate at a first speed (e.g., 100 G) and a second number of GPUs that operate at a second speed (e.g., 400 G). Such constraints may be considered by the control plane in allocating/identifying the certain number of host machines for the customer.

The process then moves to step 1220, where hierarchical locality information for each of the one or more host machines identified in step 1215 is obtained. It is noted that the locality information (of each host machine) may be stored, e.g., by the instance metadata service in the corresponding host machine. In step 1225, the process identifies linkage information of the one or more host machines. It is appreciated that the linkage information of the one or more host machines corresponds to a logical topology (e.g., logical topology as depicted in FIG. 10) formed by the one or more host machines. Thereafter, the process moves to step 1230, where the hierarchical locality information and the linkage information of the one or more host machines is provided in response to the request from the customer. According to some embodiments, the customer upon obtaining the hierarchical locality information and linkage information may select a subset of the one or more host machines for executing the workload (step 1240). It is noted that the selection of the host machines may be performed based on one or more constraints associated with the workload.

As stated previously, ECMP routing is a flow aware routing technique, where each flow (i.e., a stream of data packets) is hashed to a particular path for the duration of the flow. Thus, packets in a flow are forwarded from a network device using a particular outgoing port/link. This is typically done in order to ensure that packets in a flow arrive in order i.e., no re-ordering of packets is required. However, ECMP routing is bandwidth (or throughput) unaware. In other words, the switches perform statistical flow-aware (throughput unaware) ECMP load balancing of flows on parallel links. In standard ECMP routing (i.e., only flow aware routing), a problem is that flows received by a network device over two separate incoming links may get hashed to the same outgoing link, thereby resulting in a flow collision.

Described below is a routing technique (referred to herein as a GPU based routing policy mechanism or a GPU-based traffic routing mechanism) to overcome the above described flow collision problem. It is appreciated that the flow collision problem affects traffic from CPUs and GPUs. However, the flow collision issue is a much bigger problem for GPUs due to the stringent time synchronization requirements. Furthermore, it is to be appreciated that the standard ECMP routing mechanism will incur the flow collisions scenarios irrespective of whether the network is over or under subscribed due to its inherent property of routing information in a statistical bandwidth unaware manner.

Figure 13:
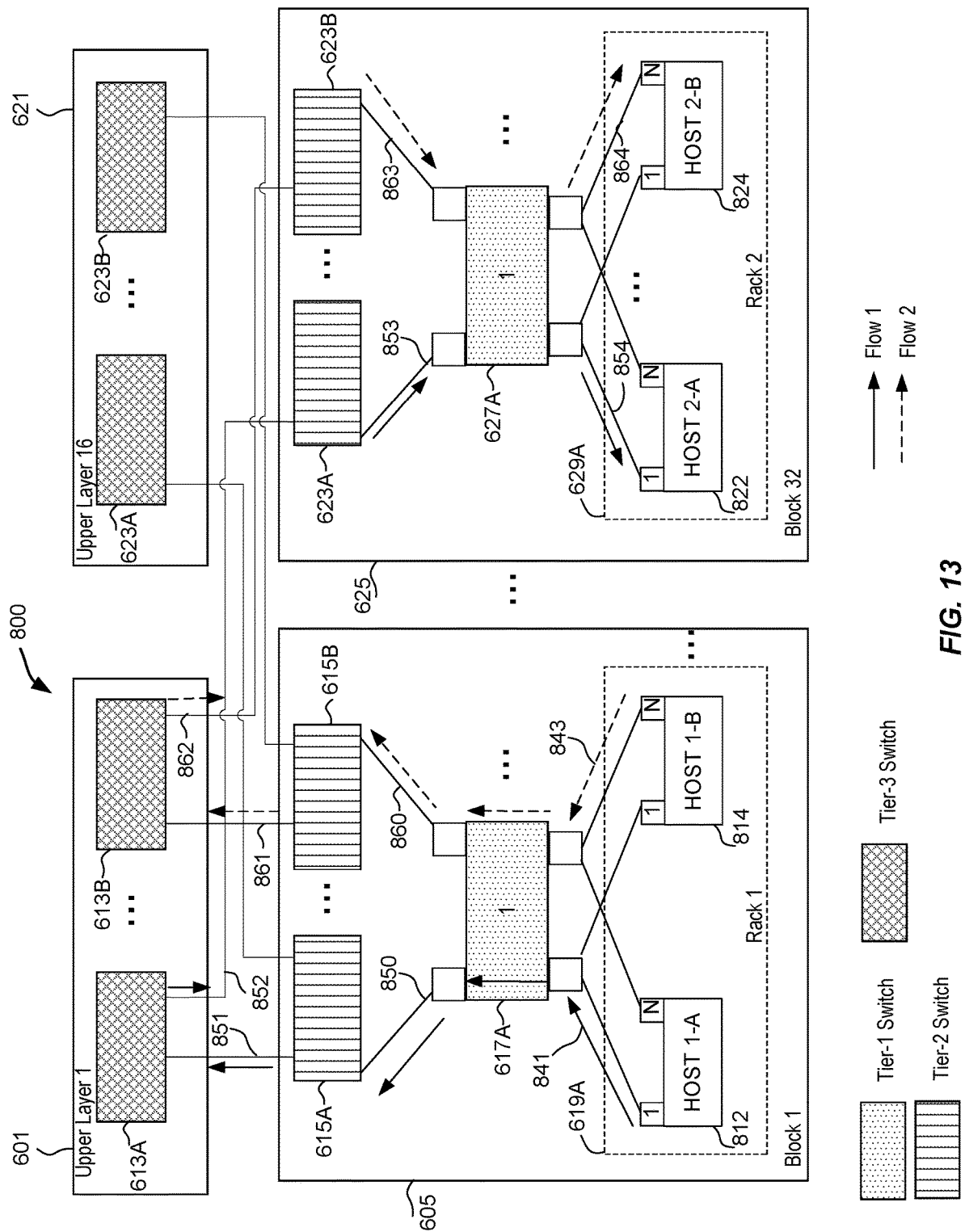
FIG. 13 depicts a policy based routing mechanism implemented in the hybrid GPU cluster, according to certain embodiments.

Turning now to FIG. 13, there is depicted a GPU based policy routing mechanism implemented in the hybrid GPU cluster, according to certain embodiments. For sake of convenience and illustration, the architecture depicted in FIG. 13 is the same architecture as that depicted in FIG. 8. According to some embodiments, data packets from a sender to a receiver are routed in the network fabric on a hop-by-hop basis. A routing policy is configured at each network device that ties an incoming port-link (of the network device) to an outgoing port-link (of the network device). The network device could be any one of the switches included in the hierarchical structure of switches i.e., Tier-1, 2, or 3. Referring to FIG. 13, there are depicted two flows: flow 1 from GPU 1 on host machine 812 whose intended destination is GPU 1 on host machine 822, and flow 2 from GPU N on host machine 814 whose intended destination is GPU N on host machine 824. In one implementation, all the network devices (i.e., switches included in the network fabric) are configured to tie (or match) an incoming port-link to an outgoing port-link. A matching of the incoming port-links to outgoing port-links is maintained (e.g., in a policy table) at each network device.

Referring to FIG. 13, it can be observed that with regard to flow 1 (i.e., flow depicted by solid lines), that when the first tier switch (617A) receives a packet on link 841, the first tier switch is configured to forward the received packet on an outgoing link 850. Similarly, when a second tier switch (615A) receives the packet via link 850, it is configured to forward the packet on outgoing link 851 to a Tier-3 switch (613A). In turn, the Tier-3 switch (613A) is configured to forward the packet received on link 851 to an outgoing link 852, in order to transmit the packet to a Tier-2 switch 623A (that is included in another block). Switch 623A in turn forwards the packet to switch 627A on its outgoing link 853, which in turn forwards the packet on outgoing link 854 to be delivered to its intended destination. It is noted that the route for flow 2 (i.e., flow depicted by dashed lines) is forwarded by the intermediate network devices in a manner similar to that describe above (with reference to flow 1) to be delivered to its intended destination. It is noted that in contrast to the scenario depicted in FIG. 8 (which utilizes ECMP routing), the scenario depicted in FIG. 13 avoids route collisions.

Figure 14:
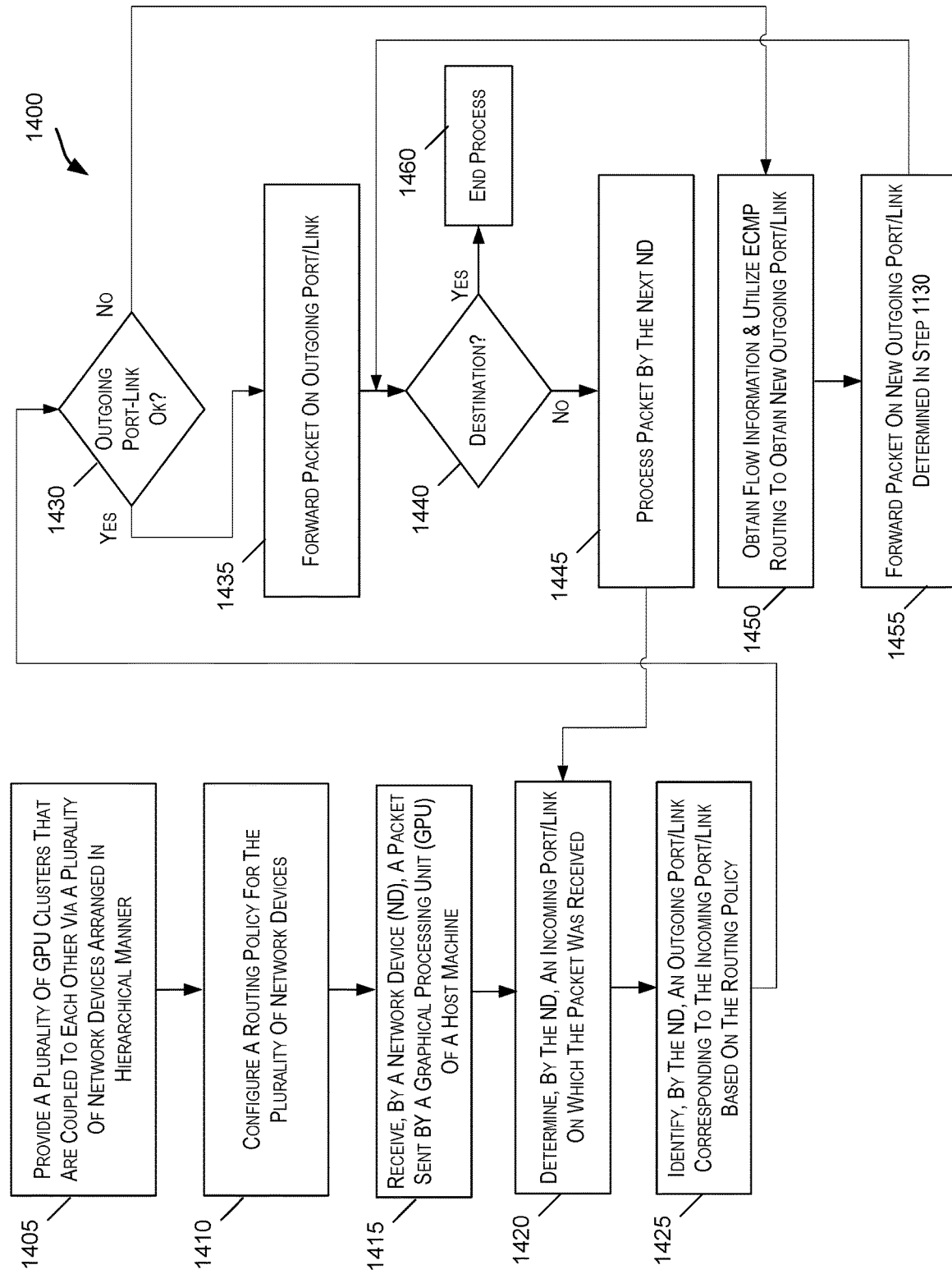
FIG. 14 illustrates a flowchart depicting steps performed by a network device in routing a packet, according to certain embodiments.

Thus, in this manner, in one implementation of the GPU policy based routing mechanism, each network device in the network fabric of FIG. 14 is configured to tie an incoming port/link to an outgoing port/link in order to avoid collisions. It is appreciated that at each network device within the cloud infrastructure, there is a 1-1 correspondence between an incoming port-link and an outgoing port-link i.e., a mapping between the incoming port-link and an outgoing port-link is performed independent of the flows and/or the protocols executed by the flows. Furthermore, in the event that an outgoing link of a particular network device fails, according to some embodiments, the network device is configured to switch its routing policy from the GPU policy based routing to a standard ECMP routing to obtain a new available output link (from various available output links) and send the flow down that new output link. It is noted that in this case, one may incur flow collision resulting in congestion.

FIG. 14 illustrates a flowchart 1400 depicting steps performed by a network device in routing a packet, according to certain embodiments. The processing depicted in FIG. 14 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 14 and described below is intended to be illustrative and non-limiting. Although FIG. 14 depicts the various processing steps occurring in a particular sequence or order, this is not intended to be limiting. In certain alternative embodiments, the steps may be performed in some different order or some steps may also be performed in parallel.

The process commences in step 1405, where a plurality of GPU clusters that are communicatively coupled to one another via a plurality of network devices (e.g., switches) arranged in a hierarchical manner is provided in a network fabric. It is appreciated that a first GPU cluster of the plurality of GPU clusters operates at a first speed (e.g., 100 G), whereas a second GPU cluster of the plurality of GPU clusters operates at a second speed (e.g., 400 G) that is different than the first speed. The process in step 1410 executes a pre-configuration step, where a routing policy is configured for each network device included in the network fabric. Note that the routing policy corresponds to mapping an incoming port-link to an outgoing port-link of the network device.

In step 1415, a network device (e.g., a first network device) receives a data packet transmitted by a graphical processing unit (GPU) of a host machine. In step 1420, the network device determines an incoming port/link that the packet was received on. In step 1425, the network device identifies an outgoing port/link corresponding to the incoming port/link (on which the packet was received) based on a policy routing information i.e., the routing information pre-configured in step 1410. According to some embodiments, the policy routing information corresponds to a pre-configured GPU routing table for the network device that ties each incoming port-link of the network device to a unique outgoing link-port of the network device.

The process then moves to step 1430, where a query is performed to determine whether the outgoing port-link is in a functioning state e.g., the outgoing link is active. If the response to the query is affirmative (i.e., the link is active), then the process moves to step 1435, else if the response to the query is negative (i.e., the link is in a failed state/inactive state), then the process moves to step 1450.

In step 1435, the network device utilizes the outgoing port-link (identified in step 1425) to forward the received data packet to another network device. Further, the process in step 1440 executes another query to determine whether the packet has reached its intended destination. If the response to the query if affirmative, the process simply terminates (step 1460). Else, if the response to the query in step 1440 is negative, the process moves to step 1445, where the next network device (i.e., the next-hop network device on the path from the source host machine to the destination host machine) processes the packet. Specifically, the next network device repeats steps 1420, 1425, 1430, 1435, and 1440.

If the response to the query of step 1430 was negative, then in step 1450, the network device obtains flow information of the data packet e.g., the flow information may correspond to a 4-tuple associated with the packet (i.e., source port, destination port, source IP address, destination IP address). Based on the obtained flow information, the network device utilizes ECMP routing to identify a new outgoing port-link i.e., an available outgoing port-link. The process then moves to step 1455, where the network device utilizes the newly obtained outgoing port-link (in step 1450) to forward the data packet. Thereafter, the process loops back to step 1440 to repeat the process until the packet is delivered to its intended destination.

According to some embodiments of the present disclosure, in another implementation of the GPU based policy routing framework, only a subset of network devices in the network fabric are configured to tie an incoming port/link to an outgoing port/link. In this implementation, the subset of network devices that implement the GPU based policy routing mechanism correspond to switches included in the Tier-1 and Tier-2 levels of the hierarchical levels of switches. For example, referring to FIG. 13, switches 617A, 627A (included in Tier-1) and switches 615A, 615B, 623A, 623B (included in Tier-2) implement the policy based routing. In this implementation, the switches in the Tier-1 and Tier-2 levels tie an incoming uplink/port to an outgoing uplink/port of the switch. It is noted that in this implementation, the switches included in the Tier-3 level do not implement the GPU policy based routing. Rather, the switches in this level may implement standard routing protocols (e.g., ECMP routing) to route the traffic. Additionally, it is appreciated that in both implementations of the GPU policy based routing, when a particular switch receives a packet that is to be forwarded, the switch determines whether a next hop of the packet is on one of the downlinks of the switch. If so, in some implementations, the packet is transmitted without policy based routing i.e., forwarded using standard routing protocols. If the packet is to be forwarded on an uplink then the switch may utilize policy based routing—i.e., dependent on the tier in which the switch is included.

According to some embodiments, the deployment of the GPU supercluster architecture of FIG. 6A or 6B poses challenges with respect to the management of a global address space (e.g., MAC addresses of each GPU included in the plurality of clusters of GPUs). Specifically, with the deployment of a large scale GPU cluster, each Tier-1 switch is required to manage and maintain (i.e., store) a MAC address table (e.g., forwarding table) including addresses of each GPU included in the cluster. Doing so, may result in an overflow of the forwarding tables of the switches. There are two problems associated with this scenario:—switches are associated with a control plane (i.e., where BGP and other routing protocols reside), and a data plane (i.e., where forwarding tables reside). The problem of maintaining an efficient address space exists in both the control plane and the data plane.

It is appreciated that forwarding tables are required to store MAC addresses (i.e., for overlay customer networks) as well as IP addresses (i.e., for underlay physical networks). As storage space in forwarding tables is limited, the problem is exacerbated in the scenario of deploying the GPU supercluster architecture of FIG. 6A or 6B. In other words, the problem presented due to the limited storage space of the forwarding tables is that of how does one limit the size of the forwarding table so that one can scale the network without having to scale the size of the forwarding table. Described below are techniques that can be utilized in both, the control plane and the data plane, respectively, for providing mechanisms to efficiently manage the storage space of the forwarding tables.

Figure 15A:
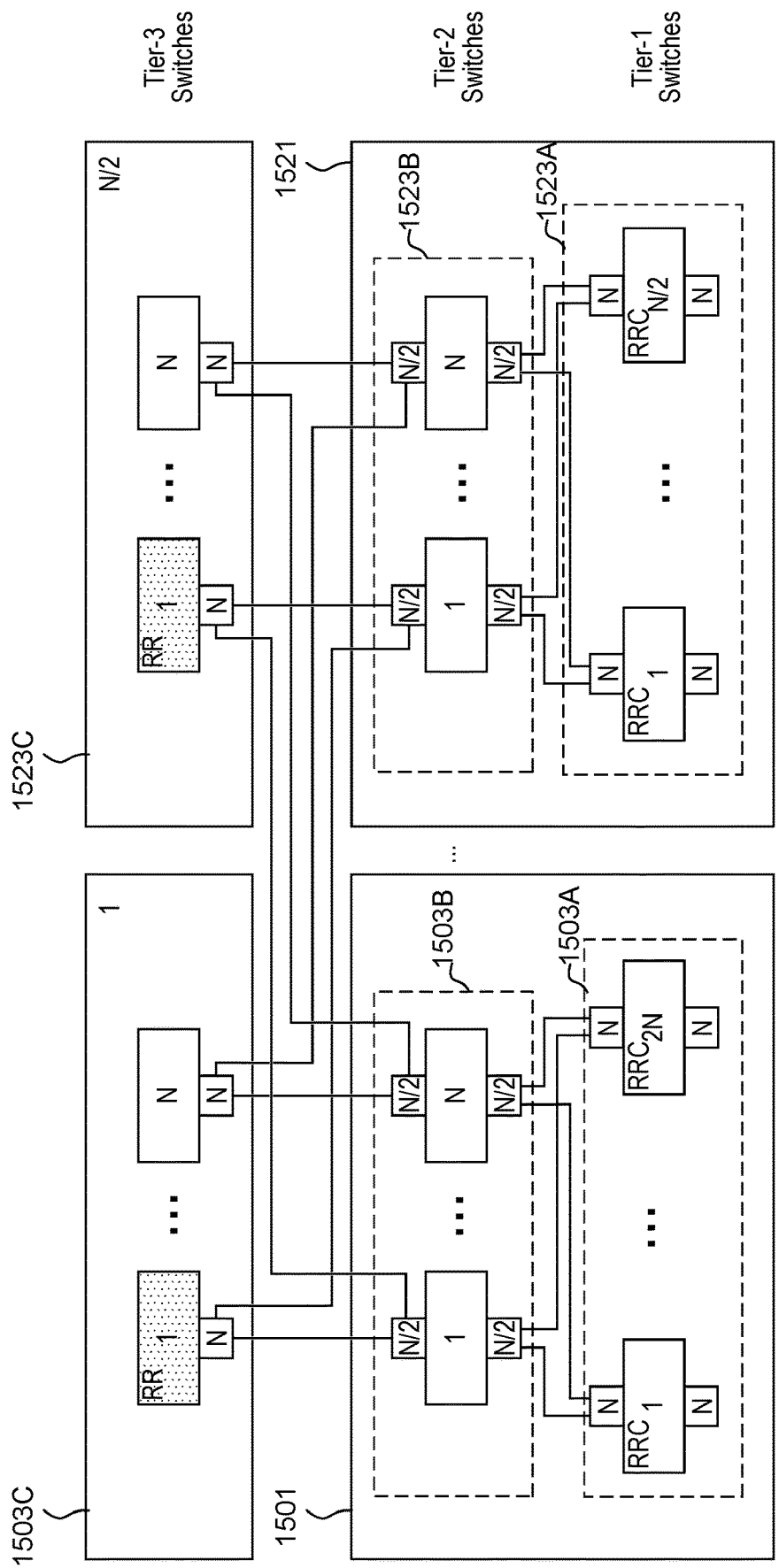
FIG. 15A depicts an architecture of the hybrid GPU cluster illustrating placement of route reflectors according to some embodiments.

FIG. 15A depicts an architecture of a hybrid GPU cluster illustrating placement of route reflectors according to some embodiments. For sake of illustration, FIG. 15A depicts the architecture as including two blocks i.e., a first block 1501 and a second block 1521. Each of the first block and the second block include a hierarchical structure of switches deployed therein. For instance, as shown in FIG. 15A, the first block 1501 includes a first tier of switches (i.e., Tier-1 switches) labeled 1503A and a second tier of switches (i.e., Tier-2 switches) labeled 1503B. The second block 1521 includes a first tier of switches labeled 1523A and a second tier of switches labeled 1523B.

Similar to the architecture of FIG. 6A, the GPU supercluster architecture of FIG. 15A includes a third tier of switches (i.e., Tier-3 switches) labeled 1503C and 1523C, respectively. It is appreciated that a plurality of switches included in the third tier of switches may be partitioned into a plurality of groups of third tier of switches (e.g., group 1503C, 1523C, respectively). Furthermore, it is noted that similar to the architecture of FIG. 6A, the first tier of switches are communicatively coupled at one end to the plurality of GPU clusters and at another end to the second tier of switches. In turn, the second tier of switches communicatively couple the first tier of switches to the third tier of switches, where the third tier of switches communicatively couple the different blocks included in the GPU supercluster architecture.

According to some embodiments, one or more switches are selected from the third tier of switches to form a set of target switches. Such target switches are referred to herein as route reflectors. It is noted that the selection of the set of target switches may be performed (in some implementations) in a random manner. In other implementations, a route reflector may be selected from each group of the plurality of groups of third tier switches. For example, a first switch included in each group of the third tier switches may be designated to perform the functions of the route reflector as described below. According to some embodiments, a total number of target switches included in the set of target switches is in a range from 4 to 16.

By some embodiments, each switch included in the first tier of switches (1503A, 1523A) forms a peering connection (e.g., BGP peering) with each of the one or more target switches i.e., route reflectors included in the third tier of switches (1503C, 1523C). The route reflectors are configured to reduce address information (e.g., MAC addresses) that is maintained in forwarding tables by the Tier-1 switches as described below. It is appreciated that when a particular Tier-1 switch receives a packet from a GPU (i.e., a GPU coupled to the particular Tier-1 switch), the Tier-1 switch may transmit address information of the GPU to each target switch via the peering connection. In this manner, each target switch that is included in the Tier-3 layer of switches, receives address information of each GPU included in the plurality of GPU clusters.

Upon receiving the address information of each GPU included in the plurality of GPU clusters, each target switch processes the received address information to generate a plurality of sets of address information. For instance, according to one embodiment, a particular target switch may filter the received address information to generate one or more sets of address information based on certain conditions. In one instance, the target switch may filter the received address information of GPUs based on a VLAN of a customer that a GPU belongs to. In other words, the sets of address information generated by the target switch corresponds to grouping together GPUs that are associated with a customer. Further, each target switch may advertise/transmit the generated one or more sets of address information to each switch included in the Tier-1 layer of switches. A particular Tier-1 switch, in turn, stores (in the forwarding table) only a subset of the received one or more sets of address information in accordance with the condition. For instance, if the particular Tier-1 switch is associated with a particular customer VLAN, then the particular Tier-1 switch may only store MAC addresses of GPUs that belong to the same customer VLAN. In this manner, the particular Tier- switch may ignore (e.g., discard) the other sets of received address information that correspond to GPUs associated with other customer VLANs. It is appreciated that the target switches may utilize other conditions for generating the one or more sets of address information. For example, the target switches may filter address information of the GPUs based on a type of GPU (i.e., blocks of GPUs operating at different speeds). In this manner, the route reflectors reduce the MAC address space in the forwarding tables in the control plane.

According to some embodiments, techniques may be utilized at the data plane layer to achieve further reduction in the number of MAC addresses maintained in the forwarding table. For example, by one technique, the switches in the Tier-1 level may be configured to the switch is further configured to purge an entry from the address table based on a timer associated with the entry. Further, a least recently used mechanism may be employed, wherein based on a usage (e.g., least used) of a particular entry, the entry may be purged from the forwarding table. Yet another approach may include summarizing the entries in an IP table (corresponding to addresses of underlay physical network components), thereby providing more storage space for MAC entries in the forwarding table. Thus, by techniques described above, embodiments of the present disclosure limit the size of the forwarding table, in order to scale the GPU cluster network without having to compromise on scaling the size of the forwarding table.

Figure 15B:
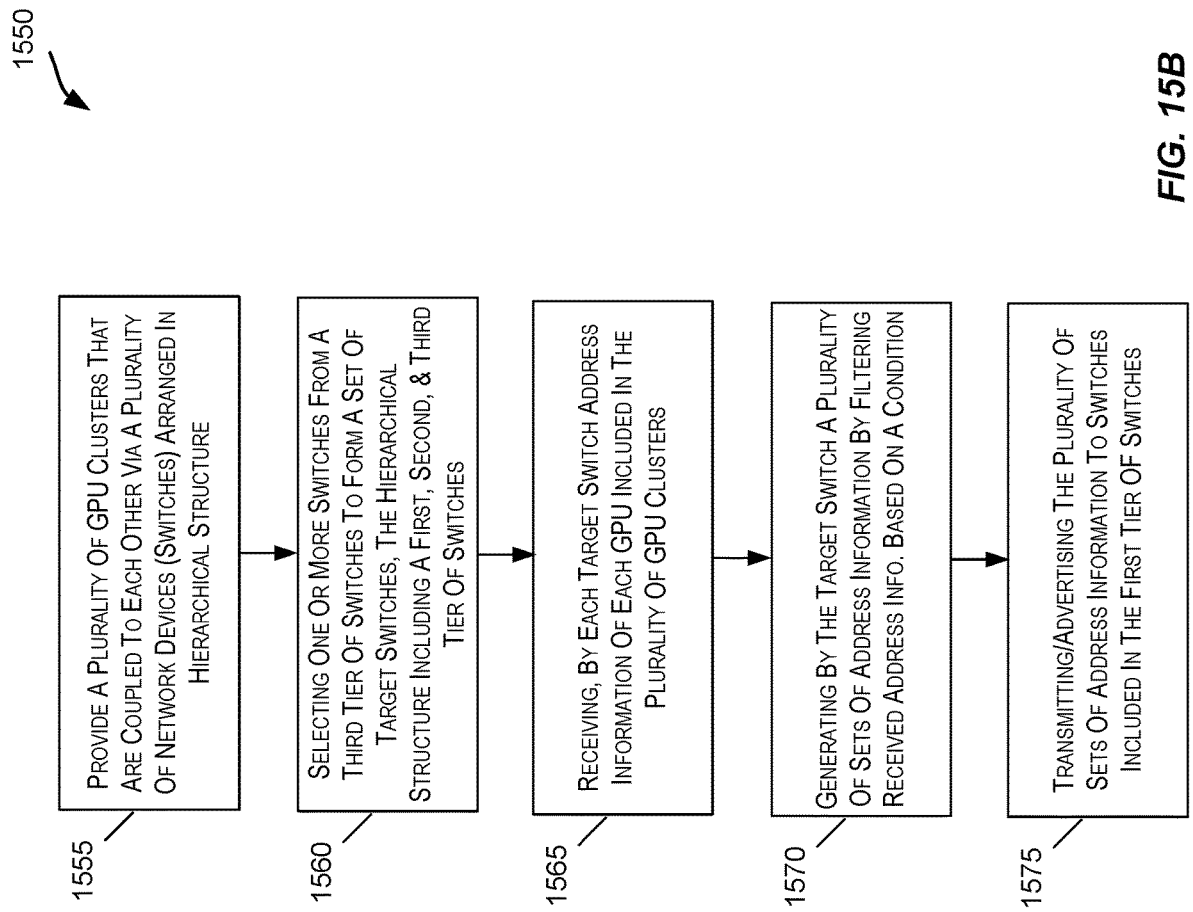
FIG. 15B illustrates a flowchart depicting steps performed by route reflectors in managing a size of an address table that is stored by switches, according to certain embodiments.

FIG. 15B illustrates a flowchart 1550 depicting steps performed by route reflectors in managing a size of an address table that is stored by switches, according to certain embodiments. The processing depicted in FIG. 15B may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 15B and described below is intended to be illustrative and non-limiting. Although FIG. 15B depicts the various processing steps occurring in a particular sequence or order, this is not intended to be limiting. In certain alternative embodiments, the steps may be performed in some different order or some steps may also be performed in parallel.

The process commences in step 1555, where a plurality of GPU clusters that are communicatively coupled to one another via a plurality of network devices (e.g., switches) arranged in a hierarchical manner is provided in a network fabric. It is appreciated that a first GPU cluster of the plurality of GPU clusters operates at a first speed (e.g., 100 G), whereas a second GPU cluster of the plurality of GPU clusters operates at a second speed (e.g., 400 G) that is different than the first speed. The hierarchical structure of switches includes at least a Tier-1 level of switches, Tier-2 level of switches, and a Tier-3 level of switches.

In step 1560, the process selects one or more switches from the Tier-3 layer of switches to form a set of target switches (i.e., route reflectors). In step 1565, each target switch included in the set of target switches receives address information (e.g., MAC addresses) of each GPU included in the plurality of GPU clusters. As described previously, each Tier-1 switch is configured to establish a peering connection (e.g., BGP connection) with each of the target switches included in the Tier-3 layer of switches. By some embodiments, address information of the GPUs may be transmitted to the target switches (e.g., by the Tier-1 switches upon receiving a packet from a GPU) via the peered connection.

The process thereafter moves to step 1570, where each target switch generates a plurality of sets of address information. By some embodiments, such sets of address information may be generated by filtering/grouping the received address information of the GPUs based on certain conditions. For example, as stated previously, a target switch may filter the received address information of GPUs based on a VLAN of a customer that a GPU belongs to. In other words, the sets of address information generated by the target switch corresponds to grouping together GPUs that are associated with a customer. In step 1575, the target switch advertises/transmits the plurality of sets of address information to each switch included in the Tier-1 level of switches. A switch included in the Tier-1 level of switches, upon receiving the sets of address information stores a subset of the plurality of sets of address information in accordance with the condition in order to conserve the storage space of forwarding tables.

Examples of Cloud Infrastructure

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 16:
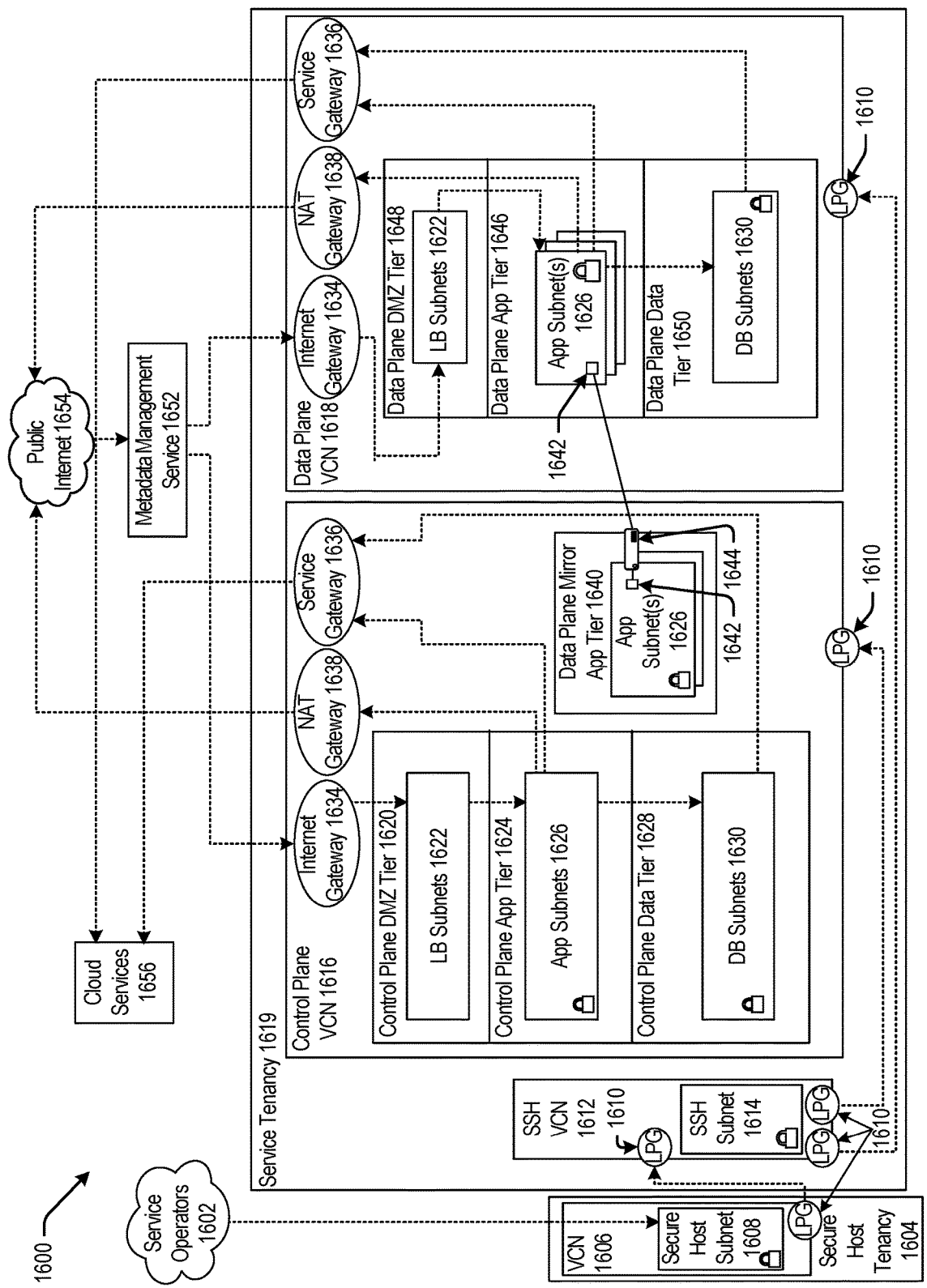
FIG. 16 is a block diagram illustrating one pattern for implementing a cloud infrastructure as a service system, according to at least one embodiment.

FIG. 16 is a block diagram 1600 illustrating an example pattern of an IaaS architecture, according to at least one embodiment. Service operators 1602 can be communicatively coupled to a secure host tenancy 1604 that can include a virtual cloud network (VCN) 1606 and a secure host subnet 1608. In some examples, the service operators 1602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1606 and/or the Internet.

The VCN 1606 can include a local peering gateway (LPG) 1610 that can be communicatively coupled to a secure shell (SSH) VCN 1612 via an LPG 1610 contained in the SSH VCN 1612. The SSH VCN 1612 can include an SSH subnet 1614, and the SSH VCN 1612 can be communicatively coupled to a control plane VCN 1616 via the LPG 1610 contained in the control plane VCN 1616. Also, the SSH VCN 1612 can be communicatively coupled to a data plane VCN 1618 via an LPG 1610. The control plane VCN 1616 and the data plane VCN 1618 can be contained in a service tenancy 1619 that can be owned and/or operated by the IaaS provider.

The control plane VCN 1616 can include a control plane demilitarized zone (DMZ) tier 1620 that acts as a perimeter network (e.g., portions of a corporate network between the corporate intranet and external networks). The DMZ-based servers may have restricted responsibilities and help keep security breaches contained. Additionally, the DMZ tier 1620 can include one or more load balancer (LB) subnet(s) 1622, a control plane app tier 1624 that can include app subnet(s) 1626, a control plane data tier 1628 that can include database (DB) subnet(s) 1630 (e.g., frontend DB subnet(s) and/or backend DB subnet(s)). The LB subnet(s) 1622 contained in the control plane DMZ tier 1620 can be communicatively coupled to the app subnet(s) 1626 contained in the control plane app tier 1624 and an Internet gateway 1634 that can be contained in the control plane VCN 1616, and the app subnet(s) 1626 can be communicatively coupled to the DB subnet(s) 1630 contained in the control plane data tier 1628 and a service gateway 1636 and a network address translation (NAT) gateway 1638. The control plane VCN 1616 can include the service gateway 1636 and the NAT gateway 1638.

The control plane VCN 1616 can include a data plane mirror app tier 1640 that can include app subnet(s) 1626. The app subnet(s) 1626 contained in the data plane mirror app tier 1640 can include a virtual network interface controller (VNIC) 1642 that can execute a compute instance 1644. The compute instance 1644 can communicatively couple the app subnet(s) 1626 of the data plane mirror app tier 1640 to app subnet(s) 1626 that can be contained in a data plane app tier 1646.

The data plane VCN 1618 can include the data plane app tier 1646, a data plane DMZ tier 1648, and a data plane data tier 1650. The data plane DMZ tier 1648 can include LB subnet(s) 1622 that can be communicatively coupled to the app subnet(s) 1626 of the data plane app tier 1646 and the Internet gateway 1634 of the data plane VCN 1618. The app subnet(s) 1626 can be communicatively coupled to the service gateway 1636 of the data plane VCN 1618 and the NAT gateway 1638 of the data plane VCN 1618. The data plane data tier 1650 can also include the DB subnet(s) 1630 that can be communicatively coupled to the app subnet(s) 1626 of the data plane app tier 1646.

The Internet gateway 1634 of the control plane VCN 1616 and of the data plane VCN 1618 can be communicatively coupled to a metadata management service 1652 that can be communicatively coupled to public Internet 1654. Public Internet 1654 can be communicatively coupled to the NAT gateway 1638 of the control plane VCN 1616 and of the data plane VCN 1618. The service gateway 1636 of the control plane VCN 1616 and of the data plane VCN 1618 can be communicatively couple to cloud services 1656.

In some examples, the service gateway 1636 of the control plane VCN 1616 or of the data plane VCN 1618 can make application programming interface (API) calls to cloud services 1656 without going through public Internet 1654. The API calls to cloud services 1656 from the service gateway 1636 can be one-way: the service gateway 1636 can make API calls to cloud services 1656, and cloud services 1656 can send requested data to the service gateway 1636. But, cloud services 1656 may not initiate API calls to the service gateway 1636.

In some examples, the secure host tenancy 1604 can be directly connected to the service tenancy 1619, which may be otherwise isolated. The secure host subnet 1608 can communicate with the SSH subnet 1614 through an LPG 1610 that may enable two-way communication over an otherwise isolated system. Connecting the secure host subnet 1608 to the SSH subnet 1614 may give the secure host subnet 1608 access to other entities within the service tenancy 1619.

The control plane VCN 1616 may allow users of the service tenancy 1619 to set up or otherwise provision desired resources. Desired resources provisioned in the control plane VCN 1616 may be deployed or otherwise used in the data plane VCN 1618. In some examples, the control plane VCN 1616 can be isolated from the data plane VCN 1618, and the data plane mirror app tier 1640 of the control plane VCN 1616 can communicate with the data plane app tier 1646 of the data plane VCN 1618 via VNICs 1642 that can be contained in the data plane mirror app tier 1640 and the data plane app tier 1646.

In some examples, users of the system, or customers, can make requests, for example create, read, update, or delete (CRUD) operations, through public Internet 1654 that can communicate the requests to the metadata management service 1652. The metadata management service 1652 can communicate the request to the control plane VCN 1616 through the Internet gateway 1634. The request can be received by the LB subnet(s) 1622 contained in the control plane DMZ tier 1620. The LB subnet(s) 1622 may determine that the request is valid, and in response to this determination, the LB subnet(s) 1622 can transmit the request to app subnet(s) 1626 contained in the control plane app tier 1624. If the request is validated and requires a call to public Internet 1654, the call to public Internet 1654 may be transmitted to the NAT gateway 1638 that can make the call to public Internet 1654. Memory that may be desired to be stored by the request can be stored in the DB subnet(s) 1630.

In some examples, the data plane mirror app tier 1640 can facilitate direct communication between the control plane VCN 1616 and the data plane VCN 1618. For example, changes, updates, or other suitable modifications to configuration may be desired to be applied to the resources contained in the data plane VCN 1618. Via a VNIC 1642, the control plane VCN 1616 can directly communicate with, and can thereby execute the changes, updates, or other suitable modifications to configuration to, resources contained in the data plane VCN 1618.

In some embodiments, the control plane VCN 1616 and the data plane VCN 1618 can be contained in the service tenancy 1619. In this case, the user, or the customer, of the system may not own or operate either the control plane VCN 1616 or the data plane VCN 1618. Instead, the IaaS provider may own or operate the control plane VCN 1616 and the data plane VCN 1618, both of which may be contained in the service tenancy 1619. This embodiment can enable isolation of networks that may prevent users or customers from interacting with other users', or other customers', resources. Also, this embodiment may allow users or customers of the system to store databases privately without needing to rely on public Internet 1654, which may not have a desired level of security, for storage.

In other embodiments, the LB subnet(s) 1622 contained in the control plane VCN 1616 can be configured to receive a signal from the service gateway 1636. In this embodiment, the control plane VCN 1616 and the data plane VCN 1618 may be configured to be called by a customer of the IaaS provider without calling public Internet 1654. Customers of the IaaS provider may desire this embodiment since database(s) that the customers use may be controlled by the IaaS provider and may be stored on the service tenancy 1619, which may be isolated from public Internet 1654.

Figure 17:
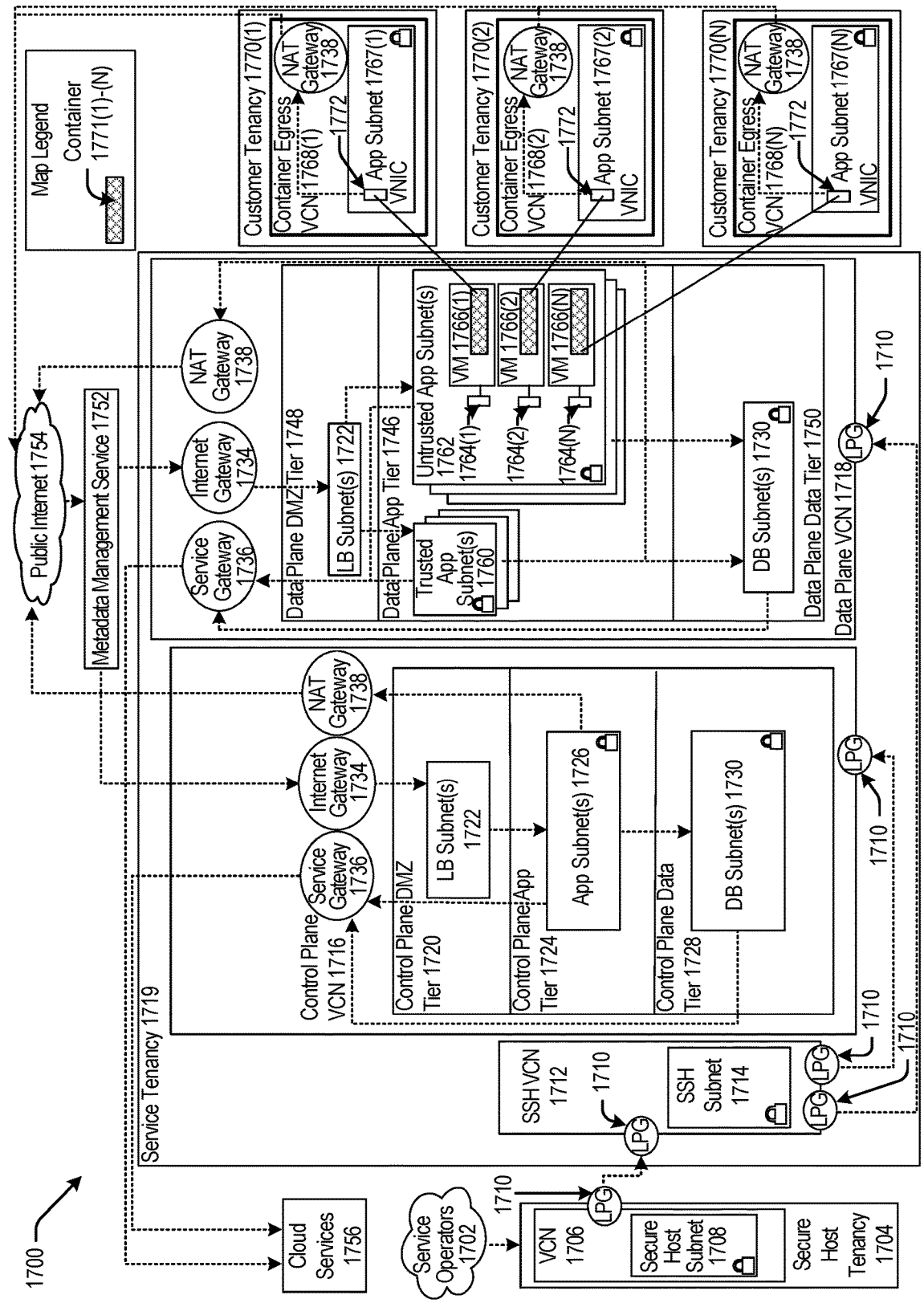
FIG. 17 is a block diagram illustrating another pattern for implementing a cloud infrastructure as a service system, according to at least one embodiment.

FIG. 17 is a block diagram 1700 illustrating another example pattern of an IaaS architecture, according to at least one embodiment. Service operators 1702 (e.g., service operators 1602 of FIG. 16) can be communicatively coupled to a secure host tenancy 1704 (e.g., the secure host tenancy 1604 of FIG. 16) that can include a virtual cloud network (VCN) 1706 (e.g., the VCN 1606 of FIG. 16) and a secure host subnet 1708 (e.g., the secure host subnet 1608 of FIG. 16). The VCN 1706 can include a local peering gateway (LPG) 1710 (e.g., the LPG 1610 of FIG. 16) that can be communicatively coupled to a secure shell (SSH) VCN 1712 (e.g., the SSH VCN 1612 of FIG. 16) via an LPG 1710 contained in the SSH VCN 1712. The SSH VCN 1712 can include an SSH subnet 1714 (e.g., the SSH subnet 1614 of FIG. 16), and the SSH VCN 1712 can be communicatively coupled to a control plane VCN 1716 (e.g., the control plane VCN 1616 of FIG. 16) via an LPG 1710 contained in the control plane VCN 1716. The control plane VCN 1716 can be contained in a service tenancy 1719 (e.g., the service tenancy 1619 of FIG. 16), and the data plane VCN 1718 (e.g., the data plane VCN 1618 of FIG. 16) can be contained in a customer tenancy 1721 that may be owned or operated by users, or customers, of the system.

The control plane VCN 1716 can include a control plane DMZ tier 1720 (e.g. the control plane DMZ tier 1620 of FIG. 16) that can include LB subnet(s) 1722 (e.g. LB subnet(s) 1622 of FIG. 16), a control plane app tier 1724 (e.g. the control plane app tier 1624 of FIG. 16) that can include app subnet(s) 1726 (e.g. app subnet(s) 1626 of FIG. 16), a control plane data tier 1728 (e.g. the control plane data tier 1628 of FIG. 16) that can include database (DB) subnet(s) 1730 (e.g. similar to DB subnet(s) 1630 of FIG. 16). The LB subnet(s) 1722 contained in the control plane DMZ tier 1720 can be communicatively coupled to the app subnet(s) 1726 contained in the control plane app tier 1724 and an Internet gateway 1734 (e.g. the Internet gateway 1634 of FIG. 16) that can be contained in the control plane VCN 1716, and the app subnet(s) 1726 can be communicatively coupled to the DB subnet(s) 1730 contained in the control plane data tier 1728 and a service gateway 1736 (e.g. the service gateway of FIG. 16) and a network address translation (NAT) gateway 1738 (e.g. the NAT gateway 1638 of FIG. 16). The control plane VCN 1716 can include the service gateway 1736 and the NAT gateway 1738.

The control plane VCN 1716 can include a data plane mirror app tier 1740 (e.g., the data plane mirror app tier 1640 of FIG. 16) that can include app subnet(s) 1726. The app subnet(s) 1726 contained in the data plane mirror app tier 1740 can include a virtual network interface controller (VNIC) 1742 (e.g., the VNIC of 1642) that can execute a compute instance 1744 (e.g., similar to the compute instance 1644 of FIG. 16). The compute instance 1744 can facilitate communication between the app subnet(s) 1726 of the data plane mirror app tier 1740 and the app subnet(s) 1726 that can be contained in a data plane app tier 1746 (e.g., the data plane app tier 1646 of FIG. 16) via the VNIC 1742 contained in the data plane mirror app tier 1740 and the VNIC 1742 contained in the data plane app tier 1746.

The Internet gateway 1734 contained in the control plane VCN 1716 can be communicatively coupled to a metadata management service 1752 (e.g., the metadata management service 1652 of FIG. 16) that can be communicatively coupled to public Internet 1754 (e.g., public Internet 1654 of FIG. 16). Public Internet 1754 can be communicatively coupled to the NAT gateway 1738 contained in the control plane VCN 1716. The service gateway 1736 contained in the control plane VCN 1716 can be communicatively couple to cloud services 1756 (e.g., cloud services 1656 of FIG. 16).

In some examples, the data plane VCN 1718 can be contained in the customer tenancy 1721. In this case, the IaaS provider may provide the control plane VCN 1716 for each customer, and the IaaS provider may, for each customer, set up a unique compute instance 1744 that is contained in the service tenancy 1719. Each compute instance 1744 may allow communication between the control plane VCN 1716, contained in the service tenancy 1719, and the data plane VCN 1718 that is contained in the customer tenancy 1721. The compute instance 1744 may allow resources that are provisioned in the control plane VCN 1716 that is contained in the service tenancy 1719, to be deployed or otherwise used in the data plane VCN 1718 that is contained in the customer tenancy 1721.

In other examples, the customer of the IaaS provider may have databases that live in the customer tenancy 1721. In this example, the control plane VCN 1716 can include the data plane mirror app tier 1740 that can include app subnet(s) 1726. The data plane mirror app tier 1740 can reside in the data plane VCN 1718, but the data plane mirror app tier 1740 may not live in the data plane VCN 1718. That is, the data plane mirror app tier 1740 may have access to the customer tenancy 1721, but the data plane mirror app tier 1740 may not exist in the data plane VCN 1718 or be owned or operated by the customer of the IaaS provider. The data plane mirror app tier 1740 may be configured to make calls to the data plane VCN 1718 but may not be configured to make calls to any entity contained in the control plane VCN 1716. The customer may desire to deploy or otherwise use resources in the data plane VCN 1718 that are provisioned in the control plane VCN 1716, and the data plane mirror app tier 1740 can facilitate the desired deployment, or other usage of resources, of the customer.

In some embodiments, the customer of the IaaS provider can apply filters to the data plane VCN 1718. In this embodiment, the customer can determine what the data plane VCN 1718 can access, and the customer may restrict access to public Internet 1754 from the data plane VCN 1718. The IaaS provider may not be able to apply filters or otherwise control access of the data plane VCN 1718 to any outside networks or databases. Applying filters and controls by the customer onto the data plane VCN 1718, contained in the customer tenancy 1721, can help isolate the data plane VCN 1718 from other customers and from public Internet 1754.

In some embodiments, cloud services 1756 can be called by the service gateway 1736 to access services that may not exist on public Internet 1754, on the control plane VCN 1716, or on the data plane VCN 1718. The connection between cloud services 1756 and the control plane VCN 1716 or the data plane VCN 1718 may not be live or continuous. Cloud services 1756 may exist on a different network owned or operated by the IaaS provider. Cloud services 1756 may be configured to receive calls from the service gateway 1736 and may be configured to not receive calls from public Internet 1754. Some cloud services 1756 may be isolated from other cloud services 1756, and the control plane VCN 1716 may be isolated from cloud services 1756 that may not be in the same region as the control plane VCN 1716. For example, the control plane VCN 1716 may be located in "Region 1," and cloud service "Deployment 16," may be located in Region 1 and in "Region 2." If a call to Deployment 16 is made by the service gateway 1736 contained in the control plane VCN 1716 located in Region 1, the call may be transmitted to Deployment 16 in Region 1. In this example, the control plane VCN 1716, or Deployment 16 in Region 1, may not be communicatively coupled to, or otherwise in communication with, Deployment 16 in Region 2.

Figure 18:
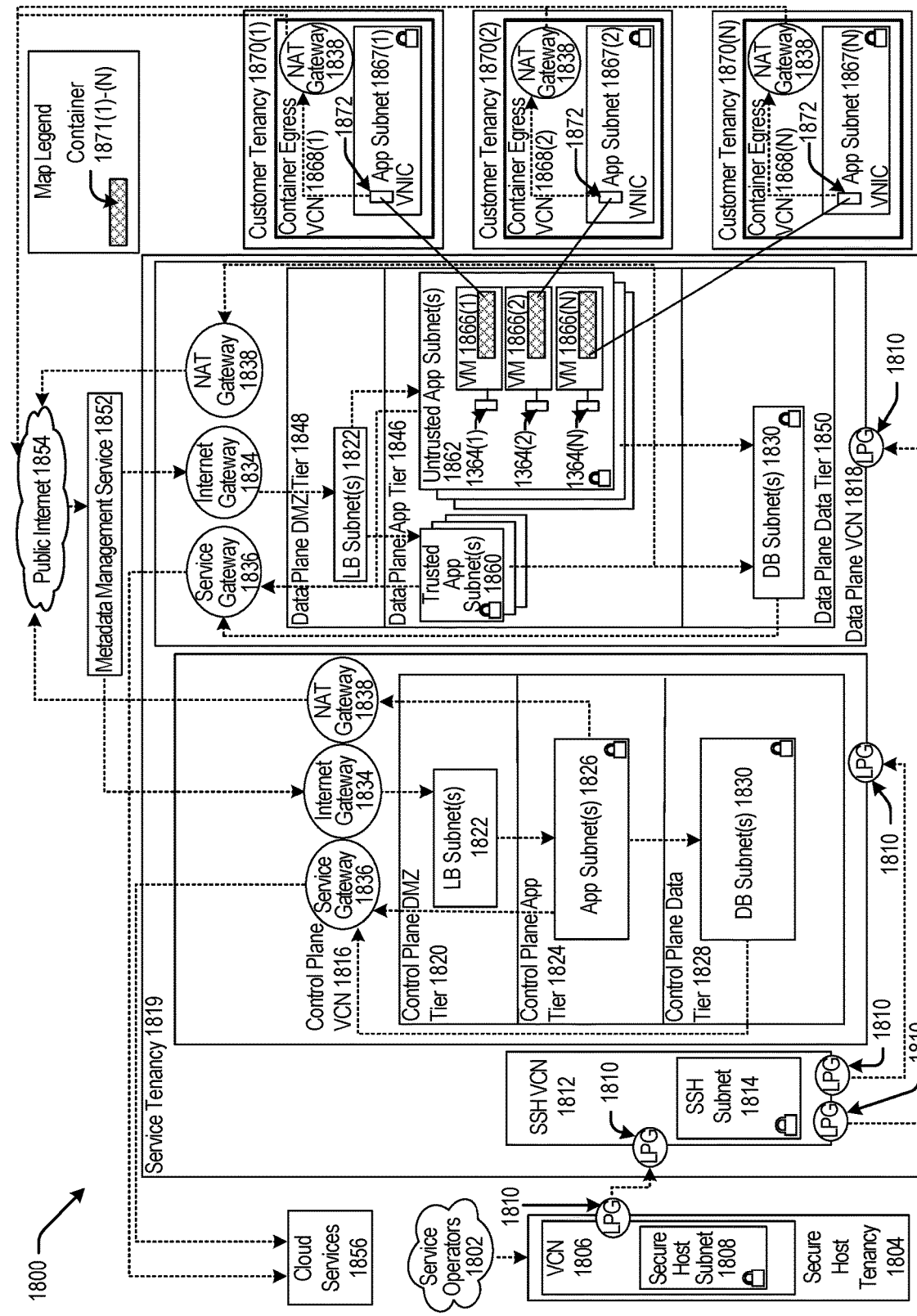
FIG. 18 is a block diagram illustrating another pattern for implementing a cloud infrastructure as a service system, according to at least one embodiment.

FIG. 18 is a block diagram 1800 illustrating another example pattern of an IaaS architecture, according to at least one embodiment. Service operators 1802 (e.g., service operators 1602 of FIG. 16) can be communicatively coupled to a secure host tenancy 1804 (e.g., the secure host tenancy 1604 of FIG. 16) that can include a virtual cloud network (VCN) 1806 (e.g., the VCN 1606 of FIG. 16) and a secure host subnet 1808 (e.g., the secure host subnet 1608 of FIG. 16). The VCN 1806 can include an LPG 1810 (e.g., the LPG 1610 of FIG. 16) that can be communicatively coupled to an SSH VCN 1812 (e.g., the SSH VCN 1612 of FIG. 16) via an LPG 1810 contained in the SSH VCN 1812. The SSH VCN 1812 can include an SSH subnet 1814 (e.g., the SSH subnet 1614 of FIG. 16), and the SSH VCN 1812 can be communicatively coupled to a control plane VCN 1816 (e.g., the control plane VCN 1616 of FIG. 16) via an LPG 1810 contained in the control plane VCN 1816 and to a data plane VCN 1818 (e.g., the data plane 1618 of FIG. 16) via an LPG 1810 contained in the data plane VCN 1818. The control plane VCN 1816 and the data plane VCN 1818 can be contained in a service tenancy 1819 (e.g., the service tenancy 1619 of FIG. 16).

The control plane VCN 1816 can include a control plane DMZ tier 1820 (e.g. the control plane DMZ tier 1620 of FIG. 16) that can include load balancer (LB) subnet(s) 1822 (e.g. LB subnet(s) 1622 of FIG. 16), a control plane app tier 1824 (e.g. the control plane app tier 1624 of FIG. 16) that can include app subnet(s) 1826 (e.g. similar to app subnet(s) 1626 of FIG. 16), a control plane data tier 1828 (e.g. the control plane data tier 1628 of FIG. 16) that can include DB subnet(s) 1830. The LB subnet(s) 1822 contained in the control plane DMZ tier 1820 can be communicatively coupled to the app subnet(s) 1826 contained in the control plane app tier 1824 and to an Internet gateway 1834 (e.g. the Internet gateway 1634 of FIG. 16) that can be contained in the control plane VCN 1816, and the app subnet(s) 1826 can be communicatively coupled to the DB subnet(s) 1830 contained in the control plane data tier 1828 and to a service gateway 1836 (e.g. the service gateway of FIG. 16) and a network address translation (NAT) gateway 1838 (e.g. the NAT gateway 1638 of FIG. 16). The control plane VCN 1816 can include the service gateway 1836 and the NAT gateway 1838.

The data plane VCN 1818 can include a data plane app tier 1846 (e.g., the data plane app tier 1646 of FIG. 16), a data plane DMZ tier 1848 (e.g., the data plane DMZ tier 1648 of FIG. 16), and a data plane data tier 1850 (e.g., the data plane data tier 1650 of FIG. 16). The data plane DMZ tier 1848 can include LB subnet(s) 1822 that can be communicatively coupled to trusted app subnet(s) 1860 and untrusted app subnet(s) 1862 of the data plane app tier 1846 and the Internet gateway 1834 contained in the data plane VCN 1818. The trusted app subnet(s) 1860 can be communicatively coupled to the service gateway 1836 contained in the data plane VCN 1818, the NAT gateway 1838 contained in the data plane VCN 1818, and DB subnet(s) 1830 contained in the data plane data tier 1850. The untrusted app subnet(s) 1862 can be communicatively coupled to the service gateway 1836 contained in the data plane VCN 1818 and DB subnet(s) 1830 contained in the data plane data tier 1850. The data plane data tier 1850 can include DB subnet(s) 1830 that can be communicatively coupled to the service gateway 1836 contained in the data plane VCN 1818.

The untrusted app subnet(s) 1862 can include one or more primary VNICs 1864(1)-(N) that can be communicatively coupled to tenant virtual machines (VMs) 1866(1)-(N). Each tenant VM 1866(1)-(N) can be communicatively coupled to a respective app subnet 1867(1)-(N) that can be contained in respective container egress VCNs 1868(1)-(N) that can be contained in respective customer tenancies 1870(1)-(N). Respective secondary VNICs 1872(1)-(N) can facilitate communication between the untrusted app subnet(s) 1862 contained in the data plane VCN 1818 and the app subnet contained in the container egress VCNs 1868(1)-(N). Each container egress VCNs 1868(1)-(N) can include a NAT gateway 1838 that can be communicatively coupled to public Internet 1854 (e.g., public Internet 1654 of FIG. 16).

The Internet gateway 1834 contained in the control plane VCN 1816 and contained in the data plane VCN 1818 can be communicatively coupled to a metadata management service 1852 (e.g., the metadata management system 1652 of FIG. 16) that can be communicatively coupled to public Internet 1854. Public Internet 1854 can be communicatively coupled to the NAT gateway 1838 contained in the control plane VCN 1816 and contained in the data plane VCN 1818. The service gateway 1836 contained in the control plane VCN 1816 and contained in the data plane VCN 1818 can be communicatively couple to cloud services 1856.

In some embodiments, the data plane VCN 1818 can be integrated with customer tenancies 1870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1846. Code to run the function may be executed in the VMs 1866(1)-(N), and the code may not be configured to run anywhere else on the data plane VCN 1818. Each VM 1866(1)-(N) may be connected to one customer tenancy 1870. Respective containers 1871(1)-(N) contained in the VMs 1866(1)-(N) may be configured to run the code. In this case, there can be a dual isolation (e.g., the containers 1871(1)-(N) running code, where the containers 1871(1)-(N) may be contained in at least the VM 1866(1)-(N) that are contained in the untrusted app subnet(s) 1862), which may help prevent incorrect or otherwise undesirable code from damaging the network of the IaaS provider or from damaging a network of a different customer. The containers 1871(1)-(N) may be communicatively coupled to the customer tenancy 1870 and may be configured to transmit or receive data from the customer tenancy 1870. The containers 1871(1)-(N) may not be configured to transmit or receive data from any other entity in the data plane VCN 1818. Upon completion of running the code, the IaaS provider may kill or otherwise dispose of the containers 1871(1)-(N).

In some embodiments, the trusted app subnet(s) 1860 may run code that may be owned or operated by the IaaS provider. In this embodiment, the trusted app subnet(s) 1860 may be communicatively coupled to the DB subnet(s) 1830 and be configured to execute CRUD operations in the DB subnet(s) 1830. The untrusted app subnet(s) 1862 may be communicatively coupled to the DB subnet(s) 1830, but in this embodiment, the untrusted app subnet(s) may be configured to execute read operations in the DB subnet(s) 1830. The containers 1871(1)-(N) that can be contained in the VM 1866(1)-(N) of each customer and that may run code from the customer may not be communicatively coupled with the DB subnet(s) 1830.

In other embodiments, the control plane VCN 1816 and the data plane VCN 1818 may not be directly communicatively coupled. In this embodiment, there may be no direct communication between the control plane VCN 1816 and the data plane VCN 1818. However, communication can occur indirectly through at least one method. An LPG 1810 may be established by the IaaS provider that can facilitate communication between the control plane VCN 1816 and the data plane VCN 1818. In another example, the control plane VCN 1816 or the data plane VCN 1818 can make a call to cloud services 1856 via the service gateway 1836. For example, a call to cloud services 1856 from the control plane VCN 1816 can include a request for a service that can communicate with the data plane VCN 1818.

Figure 19:
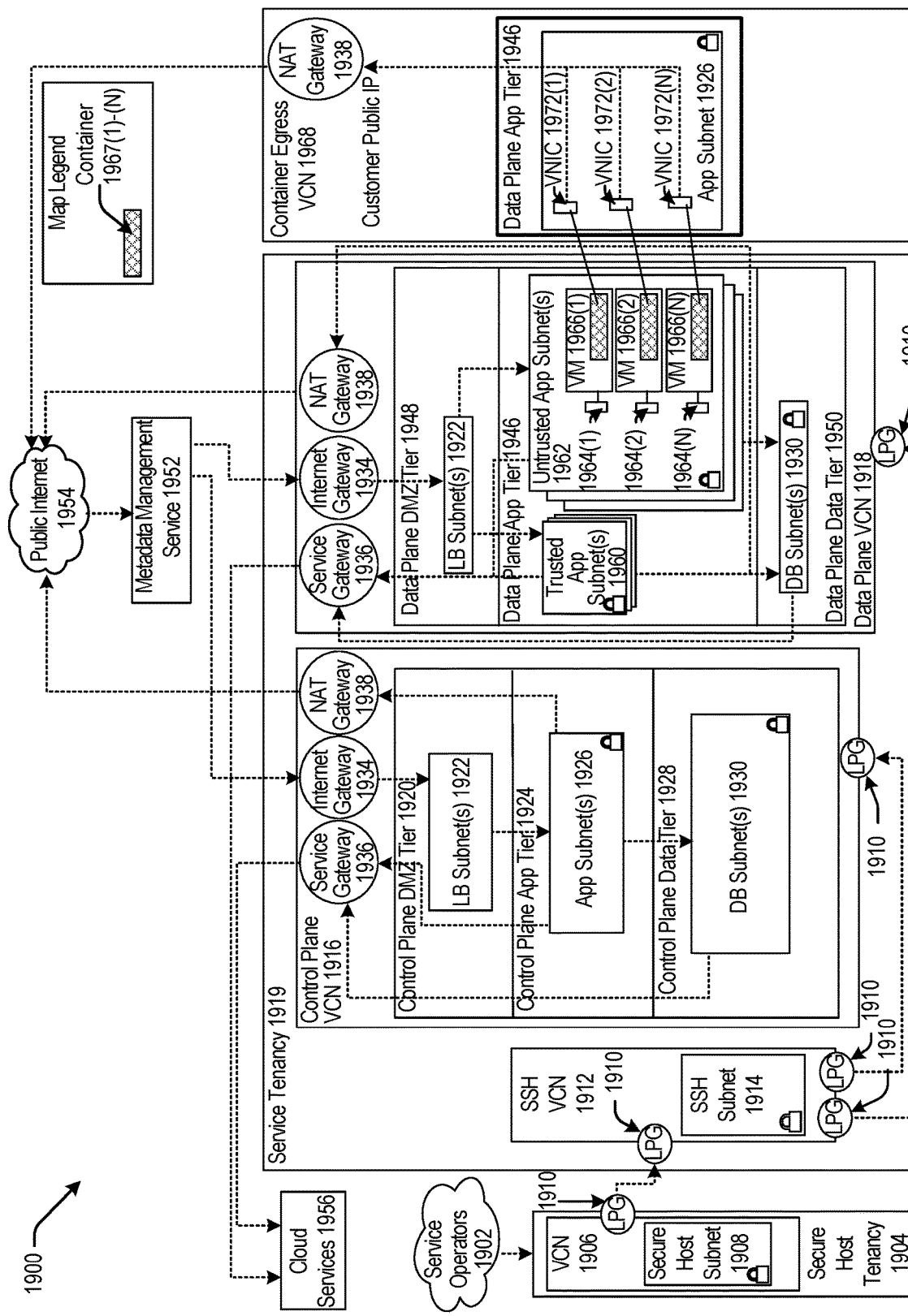
FIG. 19 is a block diagram illustrating another pattern for implementing a cloud infrastructure as a service system, according to at least one embodiment.

FIG. 19 is a block diagram 1900 illustrating another example pattern of an IaaS architecture, according to at least one embodiment. Service operators 1902 (e.g., service operators 1602 of FIG. 16) can be communicatively coupled to a secure host tenancy 1904 (e.g., the secure host tenancy 1604 of FIG. 16) that can include a virtual cloud network (VCN) 1906 (e.g., the VCN 1606 of FIG. 16) and a secure host subnet 1908 (e.g., the secure host subnet 1608 of FIG. 16). The VCN 1906 can include an LPG 1910 (e.g., the LPG 1610 of FIG. 16) that can be communicatively coupled to an SSH VCN 1912 (e.g., the SSH VCN 1612 of FIG. 16) via an LPG 1910 contained in the SSH VCN 1912. The SSH VCN 1912 can include an SSH subnet 1914 (e.g., the SSH subnet 1614 of FIG. 16), and the SSH VCN 1912 can be communicatively coupled to a control plane VCN 1916 (e.g., the control plane VCN 1616 of FIG. 16) via an LPG 1910 contained in the control plane VCN 1916 and to a data plane VCN 1918 (e.g., the data plane 1618 of FIG. 16) via an LPG 1910 contained in the data plane VCN 1918. The control plane VCN 1916 and the data plane VCN 1918 can be contained in a service tenancy 1919 (e.g., the service tenancy 1619 of FIG. 16).

The control plane VCN 1916 can include a control plane DMZ tier 1920 (e.g. the control plane DMZ tier 1620 of FIG. 16) that can include LB subnet(s) 1922 (e.g. LB subnet(s) 1622 of FIG. 16), a control plane app tier 1924 (e.g. the control plane app tier 1624 of FIG. 16) that can include app subnet(s) 1926 (e.g. app subnet(s) 1626 of FIG. 16), a control plane data tier 1928 (e.g. the control plane data tier 1628 of FIG. 16) that can include DB subnet(s) 1930 (e.g. DB subnet(s) 1830 of FIG. 18). The LB subnet(s) 1922 contained in the control plane DMZ tier 1920 can be communicatively coupled to the app subnet(s) 1926 contained in the control plane app tier 1924 and to an Internet gateway 1934 (e.g. the Internet gateway 1634 of FIG. 16) that can be contained in the control plane VCN 1916, and the app subnet(s) 1926 can be communicatively coupled to the DB subnet(s) 1930 contained in the control plane data tier 1928 and to a service gateway 1936 (e.g. the service gateway of FIG. 16) and a network address translation (NAT) gateway 1938 (e.g. the NAT gateway 1638 of FIG. 16). The control plane VCN 1916 can include the service gateway 1936 and the NAT gateway 1938.

The data plane VCN 1918 can include a data plane app tier 1946 (e.g., the data plane app tier 1646 of FIG. 16), a data plane DMZ tier 1948 (e.g., the data plane DMZ tier 1648 of FIG. 16), and a data plane data tier 1950 (e.g., the data plane data tier 1650 of FIG. 16). The data plane DMZ tier 1948 can include LB subnet(s) 1922 that can be communicatively coupled to trusted app subnet(s) 1960 (e.g., trusted app subnet(s) 1860 of FIG. 18) and untrusted app subnet(s) 1962 (e.g., untrusted app subnet(s) 1862 of FIG. 18) of the data plane app tier 1946 and the Internet gateway 1934 contained in the data plane VCN 1918. The trusted app subnet(s) 1960 can be communicatively coupled to the service gateway 1936 contained in the data plane VCN 1918, the NAT gateway 1938 contained in the data plane VCN 1918, and DB subnet(s) 1930 contained in the data plane data tier 1950. The untrusted app subnet(s) 1962 can be communicatively coupled to the service gateway 1936 contained in the data plane VCN 1918 and DB subnet(s) 1930 contained in the data plane data tier 1950. The data plane data tier 1950 can include DB subnet(s) 1930 that can be communicatively coupled to the service gateway 1936 contained in the data plane VCN 1918.

The untrusted app subnet(s) 1962 can include primary VNICs 1964(1)-(N) that can be communicatively coupled to tenant virtual machines (VMs) 1966(1)-(N) residing within the untrusted app subnet(s) 1962. Each tenant VM 1966(1)-(N) can run code in a respective container 1967(1)-(N) and be communicatively coupled to an app subnet 1926 that can be contained in a data plane app tier 1946 that can be contained in a container egress VCN 1968. Respective secondary VNICs 1972(1)-(N) can facilitate communication between the untrusted app subnet(s) 1962 contained in the data plane VCN 1918 and the app subnet contained in the container egress VCN 1968. The container egress VCN can include a NAT gateway 1938 that can be communicatively coupled to public Internet 1954 (e.g., public Internet 1654 of FIG. 16).

The Internet gateway 1934 contained in the control plane VCN 1916 and contained in the data plane VCN 1918 can be communicatively coupled to a metadata management service 1952 (e.g., the metadata management system 1652 of FIG. 16) that can be communicatively coupled to public Internet 1954. Public Internet 1954 can be communicatively coupled to the NAT gateway 1938 contained in the control plane VCN 1916 and contained in the data plane VCN 1918. The service gateway 1936 contained in the control plane VCN 1916 and contained in the data plane VCN 1918 can be communicatively couple to cloud services 1956.

In some examples, the pattern illustrated by the architecture of block diagram 1900 of FIG. 19 may be considered an exception to the pattern illustrated by the architecture of block diagram 1800 of FIG. 18 and may be desirable for a customer of the IaaS provider if the IaaS provider cannot directly communicate with the customer (e.g., a disconnected region). The respective containers 1967(1)-(N) that are contained in the VMs 1966(1)-(N) for each customer can be accessed in real-time by the customer. The containers 1967(1)-(N) may be configured to make calls to respective secondary VNICs 1972(1)-(N) contained in app subnet(s) 1926 of the data plane app tier 1946 that can be contained in the container egress VCN 1968. The secondary VNICs 1972(1)-(N) can transmit the calls to the NAT gateway 1938 that may transmit the calls to public Internet 1954. In this example, the containers 1967(1)-(N) that can be accessed in real-time by the customer can be isolated from the control plane VCN 1916 and can be isolated from other entities contained in the data plane VCN 1918. The containers 1967(1)-(N) may also be isolated from resources from other customers.

In other examples, the customer can use the containers 1967(1)-(N) to call cloud services 1956. In this example, the customer may run code in the containers 1967(1)-(N) that requests a service from cloud services 1956. The containers 1967(1)-(N) can transmit this request to the secondary VNICs 1972(1)-(N) that can transmit the request to the NAT gateway that can transmit the request to public Internet 1954. Public Internet 1954 can transmit the request to LB subnet(s) 1922 contained in the control plane VCN 1916 via the Internet gateway 1934. In response to determining the request is valid, the LB subnet(s) can transmit the request to app subnet(s) 1926 that can transmit the request to cloud services 1956 via the service gateway 1936.

It should be appreciated that IaaS architectures 1600, 1700, 1800, 1900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 20:
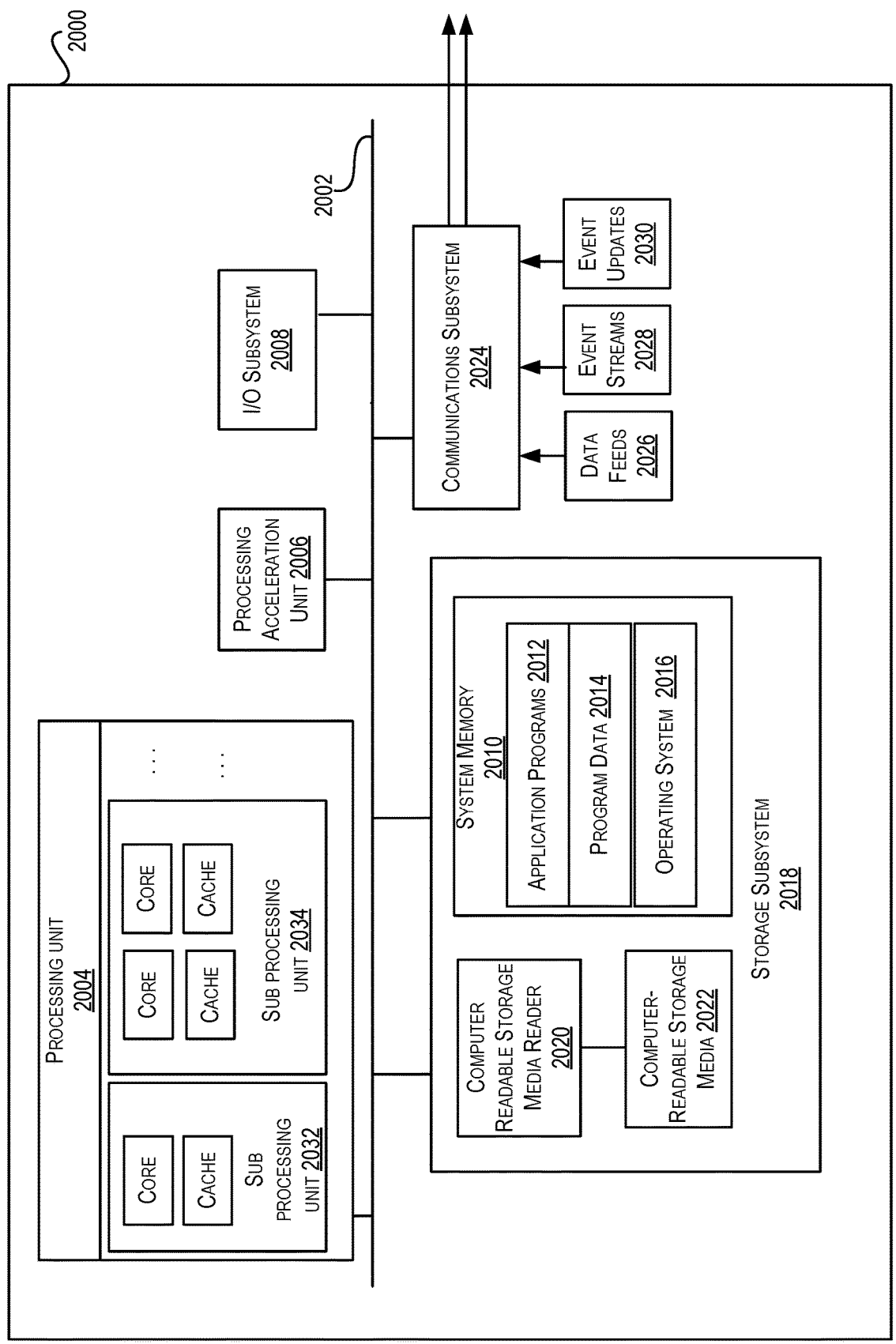
FIG. 20 is a block diagram illustrating an example computer system, according to at least one embodiment.

FIG. 20 illustrates an example computer system 2000, in which various embodiments may be implemented. The system 2000 may be used to implement any of the computer systems described above. As shown in the figure, computer system 2000 includes a processing unit 2004 that communicates with a number of peripheral subsystems via a bus subsystem 2002. These peripheral subsystems may include a processing acceleration unit 2006, and I/O subsystem 2008, a storage subsystem 2018 and a communications subsystem 2024. Storage subsystem 2018 includes tangible computer-readable storage media 2022 and a system memory 2010.

Bus subsystem 2002 provides a mechanism for letting the various components and subsystems of computer system 2000 communicate with each other as intended. Although bus subsystem 2002 is shown schematically as a single bus, alternative embodiments of the bus subsystem may utilize multiple buses. Bus subsystem 2002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2004, which can be implemented as one or more integrated circuits (e.g., a conventional microprocessor or microcontroller), controls the operation of computer system 2000. One or more processors may be included in processing unit 2004. These processors may include single core or multicore processors. In certain embodiments, processing unit 2004 may be implemented as one or more independent processing units 2032 and/or 2034 with single or multicore processors included in each processing unit. In other embodiments, processing unit 2004 may also be implemented as a quad-core processing unit formed by integrating two dual-core processors into a single chip.

In various embodiments, processing unit 2004 can execute a variety of programs in response to program code and can maintain multiple concurrently executing programs or processes. At any given time, some or all of the program code to be executed can be resident in processor(s) 2004 and/or in storage subsystem 2018. Through suitable programming, processor(s) 2004 can provide various functionalities described above. Computer system 2000 may additionally include a processing acceleration unit 2006, which can include a digital signal processor (DSP), a special-purpose processor, and/or the like.

I/O subsystem 2008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2000 may comprise a storage subsystem 2018 that comprises software elements, shown as being currently located within a system memory 2010. System memory 2010 may store program instructions that are loadable and executable on processing unit 2004, as well as data generated during the execution of these programs.

Depending on the configuration and type of computer system 2000, system memory 2010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2004. In some implementations, system memory 2010 may include multiple different types of memory, such as static random access memory (SRAM) or dynamic random access memory (DRAM). In some implementations, a basic input/output system (BIOS), containing the basic routines that help to transfer information between elements within computer system 2000, such as during start-up, may typically be stored in the ROM. By way of example, and not limitation, system memory 2010 also illustrates application programs 2012, which may include client applications, Web browsers, mid-tier applications, relational database management systems (RDBMS), etc., program data 2014, and an operating system 2016. By way of example, operating system 2016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 20 OS, and Palm® OS operating systems.

Storage subsystem 2018 may also provide a tangible computer-readable storage medium for storing the basic programming and data constructs that provide the functionality of some embodiments. Software (programs, code modules, instructions) that when executed by a processor provide the functionality described above may be stored in storage subsystem 2018. These software modules or instructions may be executed by processing unit 2004. Storage subsystem 2018 may also provide a repository for storing data used in accordance with the present disclosure.

Storage subsystem 2000 may also include a computer-readable storage media reader 2020 that can further be connected to computer-readable storage media 2022. Together and optionally, in combination with system memory 2010, computer-readable storage media 2022 may comprehensively represent remote, local, fixed, and/or removable storage devices plus storage media for temporarily and/or more permanently containing, storing, transmitting, and retrieving computer-readable information.

Computer-readable storage media 2022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information, and which can be accessed by computing system 2000.

By way of example, computer-readable storage media 2022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2022 may include, but is not limited to, Zip® drives, flash memory cards, universal serial bus (USB) flash drives, secure digital (SD) cards, DVD disks, digital video tape, and the like. Computer-readable storage media 2022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2000.

Communications subsystem 2024 provides an interface to other computer systems and networks. Communications subsystem 2024 serves as an interface for receiving data from and transmitting data to other systems from computer system 2000. For example, communications subsystem 2024 may enable computer system 2000 to connect to one or more devices via the Internet. In some embodiments communications subsystem 2024 can include radio frequency (RF) transceiver components for accessing wireless voice and/or data networks (e.g., using cellular telephone technology, advanced data network technology, such as 3 G, 4 G or EDGE (enhanced data rates for global evolution), Wi-Fi (IEEE 802.11 family standards, or other mobile communication technologies, or any combination thereof), global positioning system (GPS) receiver components, and/or other components. In some embodiments communications subsystem 2024 can provide wired network connectivity (e.g., Ethernet) in addition to or instead of a wireless interface.

In some embodiments, communications subsystem 2024 may also receive input communication in the form of structured and/or unstructured data feeds 2026, event streams 2028, event updates 2030, and the like on behalf of one or more users who may use computer system 2000.

By way of example, communications subsystem 2024 may be configured to receive data feeds 2026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2024 may also be configured to receive data in the form of continuous data streams, which may include event streams 2028 of real-time events and/or event updates 2030 that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2024 may also be configured to output the structured and/or unstructured data feeds 2026, event streams 2028, event updates 2030, and the like to one or more databases that may be in communication with one or more streaming data source computers coupled to computer system 2000.

Computer system 2000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments, and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein. In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
providing a network fabric including: (i) a plurality of graphical processing unit (GPU) clusters, the plurality of GPU clusters including at least a first GPU cluster operating at a first speed and a second GPU cluster operating at a second speed that is different than the first speed, and (ii) a plurality of blocks, wherein each block includes: (a) one or more racks that host a GPU cluster, and (b) a plurality of switches arranged in a hierarchical structure that communicatively couple the block to other blocks included in the network fabric; and responsive to receiving a request to execute a workload, allocating one or more GPUs from the plurality of GPU clusters to execute the workload.

2. The method of claim 1, wherein the network fabric includes:
a first block hosting the first GPU cluster operating at the first speed, the first GPU cluster including a first number of GPUs, and
a second block hosting the second GPU cluster operating at the second speed, the second GPU cluster including a second number of GPUs, and wherein each GPU included in the first GPU cluster operates at the first speed, and each GPU included in the second GPU cluster operates at the second speed.

3. The method of claim 2, wherein each of the first block and the second block of the plurality of blocks includes:
a first tier of switches of the hierarchical structure, wherein each switch included in the first tier of switches has a first dimension, and
a second tier of switches of the hierarchical structure, wherein each switch included in the second tier of switches has a second dimension that is different than the first dimension, and wherein the first tier of switches are communicatively coupled at one end to the one or more racks and at another end to the second tier of switches.

4. The method of claim 3, wherein the first dimension of a first switch included in the first tier of switches in the first block corresponds to a first number of downstream ports and a second number of upstream ports, wherein each port included in the first number of downstream ports and each port included in the second number of upstream ports operates at the first speed.

5. The method of claim 3, wherein the second dimension of a second switch included in the second tier of switches corresponds to a third number of downstream ports and a fourth number of upstream ports, wherein each port included in the third number of downstream ports and each port included in the fourth number of upstream ports operates at the second speed.

6. The method of claim 5, wherein each port of the third number of downstream ports of the second switch included in the first block is split into multiple sub-ports, each sub-port being communicatively coupled to a unique switch in the first tier of switches of the first block.

7. The method of claim 3, wherein the first dimension of a third switch included in the first tier of switches in the second block corresponds to a fifth number of downstream ports and a sixth number of upstream ports, wherein each port included in the fifth number of downstream ports and each port included in the sixth number of upstream ports operates at the second speed.

8. The method of claim 2, wherein the first GPU cluster included in the first block operates at the first speed of 100 G, and the second GPU cluster included in the second block operates at the second speed of 400 G.

9. The method of claim 3, wherein the network fabric further includes a plurality of groups of third tier of switches, wherein a first group of third tier of switches communicatively couples the first block to the second block.

10. The method of claim 9, wherein each switch included in the first group of third tier of switches includes ports that operate at the second speed and are communicatively coupled to the second tier of switches included in the first block and the second block.

11. One or more computer readable non-transitory media storing computer-executable instructions that, when executed by one or more processors, cause:
providing a network fabric including: (i) a plurality of graphical processing unit (GPU) clusters, the plurality of GPU clusters including at least a first GPU cluster operating at a first speed and a second GPU cluster operating at a second speed that is different than the first speed, and (ii) a plurality of blocks, wherein each block includes: (a) one or more racks that host a GPU cluster, and (b) a plurality of switches arranged in a hierarchical structure that communicatively couple the block to other blocks included in the network fabric; and
responsive to receiving a request to execute a workload, allocating one or more GPUs from the plurality of GPU clusters to execute the workload.

12. The one or more computer readable non-transitory media storing computer-executable instructions of claim 11, wherein the network fabric includes:
a first block hosting the first GPU cluster operating at the first speed, the first GPU cluster including a first number of GPUs, and
a second block hosting the second GPU cluster operating at the second speed, the second GPU cluster including a second number of GPUs, and wherein each GPU included in the first GPU cluster operates at the first speed, and each GPU included in the second GPU cluster operates at the second speed.

13. The one or more computer readable non-transitory media storing computer-executable instructions of claim 12, wherein each of the first block and the second block of the plurality of blocks includes:
a first tier of switches of the hierarchical structure, wherein each switch included in the first tier of switches has a first dimension, and
a second tier of switches of the hierarchical structure, wherein each switch included in the second tier of switches has a second dimension that is different than the first dimension, and wherein the first tier of switches are communicatively coupled at one end to the one or more racks and at another end to the second tier of switches.

14. The one or more computer readable non-transitory media storing computer-executable instructions of claim 13, wherein the first dimension of a first switch included in the first tier of switches in the first block corresponds to a first number of downstream ports and a second number of upstream ports, wherein each port included in the first number of downstream ports and each port included in the second number of upstream ports operates at the first speed.

15. The one or more computer readable non-transitory media storing computer-executable instructions of claim 13, wherein the second dimension of a second switch included in the second tier of switches corresponds to a third number of downstream ports and a fourth number of upstream ports, wherein each port included in the third number of downstream ports and each port included in the fourth number of upstream ports operates at the second speed.

16. The one or more computer readable non-transitory media storing computer-executable instructions of claim 15, wherein each port of the third number of downstream ports of the second switch included in the first block is split into multiple sub-ports, each sub-port being communicatively coupled to a unique switch in the first tier of switches of the first block.

17. The one or more computer readable non-transitory media storing computer-executable instructions of claim 13, wherein the first dimension of a third switch included in the first tier of switches in the second block corresponds to a fifth number of downstream ports and a sixth number of upstream ports, wherein each port included in the fifth number of downstream ports and each port included in the sixth number of upstream ports operates at the second speed.

18. The one or more computer readable non-transitory media storing computer-executable instructions of claim 12, wherein the first GPU cluster included in the first block operates at the first speed of 100 G, and the second GPU cluster included in the second block operates at the second speed of 400 G.

19. The one or more computer readable non-transitory media storing computer-executable instructions of claim 13, wherein the network fabric further includes a plurality of groups of third tier of switches, wherein a first group of third tier of switches communicatively couples the first block to the second block.

20. A computing device comprising:

one or more processors; and a memory including instructions that, when executed with the one or more processors, cause the computing device to, at least:

provide a network fabric including: (i) a plurality of graphical processing unit (GPU) clusters, the plurality of GPU clusters including at least a first GPU cluster operating at a first speed and a second GPU cluster operating at a second speed that is different than the first speed, and (ii) a plurality of blocks, wherein each block includes: (a) one or more racks that host a GPU cluster, and (b) a plurality of switches arranged in a hierarchical structure that communicatively couple the block to other blocks included in the network fabric; and responsive to receiving a request to execute a workload, allocate one or more GPUs from the plurality of GPU clusters to execute the workload.

* * * * *